(12) United States Patent
Morimoto et al.

(10) Patent No.: US 12,399,498 B2
(45) Date of Patent: Aug. 26, 2025

(54) CULTIVATED LAND WORK VEHICLE AND AGRICULTURAL MATERIAL REPLENISHMENT METHOD

(71) Applicant: KUBOTA CORPORATION, Osaka (JP)

(72) Inventors: Takanori Morimoto, Sakai (JP); Kotaro Yamaguchi, Amagasaki (JP); Fumiya Yoshimura, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 174 days.

(21) Appl. No.: 18/272,136

(22) PCT Filed: Dec. 6, 2021

(86) PCT No.: PCT/JP2021/044756
§ 371 (c)(1),
(2) Date: Jul. 13, 2023

(87) PCT Pub. No.: WO2022/168423
PCT Pub. Date: Aug. 11, 2022

(65) Prior Publication Data
US 2024/0069557 A1    Feb. 29, 2024

(30) Foreign Application Priority Data

Feb. 3, 2021  (JP) .................................. 2021-015715

(51) Int. Cl.
G05D 1/00      (2024.01)
A01B 69/00    (2006.01)
A01C 21/00    (2006.01)

(52) U.S. Cl.
CPC ......... G05D 1/0219 (2013.01); A01B 69/004 (2013.01); A01C 21/005 (2013.01)

(58) Field of Classification Search
CPC .............. G05D 1/0219; G05D 1/0278; G05D 2107/21; G05D 2105/15; G05D 1/0212;
(Continued)

(56) References Cited

U.S. PATENT DOCUMENTS

2021/0148083 A1* 5/2021 Taylor .................. G05D 1/0225

FOREIGN PATENT DOCUMENTS

JP    2015-112071 A    6/2015
JP    2020-110108 A    7/2020

* cited by examiner

*Primary Examiner* — Bao Long T Nguyen
(74) *Attorney, Agent, or Firm* — Keating & Bennett, LLP

(57) ABSTRACT

A cultivated land work vehicle includes a vehicle position computer, a travel controller to control travel of the body based on a vehicle position and target routes, and a replenishment mode executor to execute a replenishment travel mode to replenish the cultivated land work vehicle with agricultural material, during U-turn transition travel. In a first replenishment travel mode, reverse travel into the boundary area is performed after a starting point of the next travel route his reached, and forward travel to the starting point of the next travel route his performed after replenishment work is complete. In a second replenishment travel mode, reverse travel into the boundary area is performed before the starting point of the next travel route is reached, and forward travel to the starting point of the next travel route is performed after the replenishment work is complete.

11 Claims, 14 Drawing Sheets

(58) Field of Classification Search
CPC ...... G05D 1/646; G05D 1/648; A01B 69/004; A01B 69/008; A01C 21/005; B62D 15/025
See application file for complete search history.

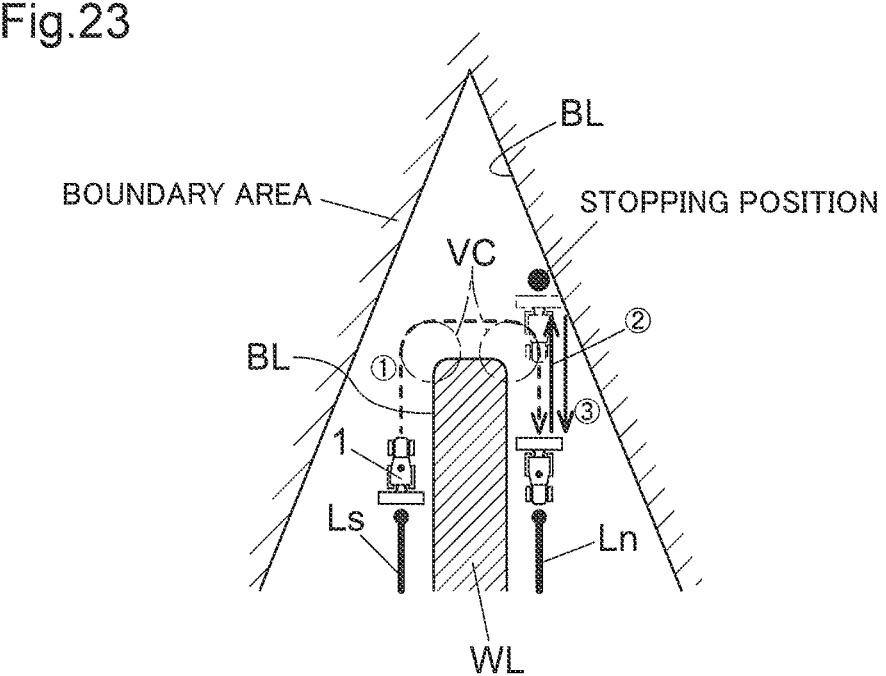

CULTIVATED LAND WORK VEHICLE AND AGRICULTURAL MATERIAL REPLENISHMENT METHOD

BACKGROUND OF THE INVENTION

1. Field of the Invention

The present invention relates to a cultivated land work vehicle and an agricultural material replenishment method for supplying agricultural material to a cultivated land while traveling autonomously along a travel route set in the cultivated land surrounded by a boundary area.

2. Description of the Related Art

A cultivated land work vehicle that supplies agricultural material to a cultivated land while travelling needs to be replenished with agricultural material while the vehicle is travelling. For example, the cultivated land work vehicle described in JP 2015-112071A has the function of reporting when the remaining amount of agricultural material to be supplied to the cultivated land falls below a threshold level and stopping the autonomous travel, and the function of computing an emergency travel route for the vehicle to travel autonomously to a nearby ridge to be replenished with the necessary material.

The cultivated land work vehicle described in JP 2020-110108A has the function of computing a replenishment position for replenishing with agricultural material, and the loading amount for replenishing, based on the amount of the agricultural material loaded, and the unit input amount of agricultural material. Agricultural material is supplied to the cultivated land through circular travel performed along a peripheral travel route set in a peripheral area of the cultivated land and back-and-forth travel performed along a back-and-forth travel route set in a central area inward from the peripheral area. The back-and-forth travel route is including forward and reverse routes that are linear, and a U-turn (180 degrees) route connecting the forward and reverse routes. A replenishment position is set in a boundary area (a ridge or a farm road) of the cultivated land, and the computed required loading amount of agricultural material is prepared at the replenishment position.

SUMMARY OF THE INVENTION

With the cultivated land work vehicle according to JP 2015-112071A, when the remaining amount of agricultural material falls below a threshold level, the vehicle computes an emergency travel route to a nearby ridge to be replenished with agricultural material. The vehicle travels along the emergency travel route in a non-working mode. Therefore, considering work efficiency, a shorter travel time is desirable. However, J P 2015-112071A does not disclose a specific method of computing an emergency travel route.

With the cultivated land work vehicle according to JP 2020-110108A, a replenishment position is estimated in the cultivated land boundary area, and agricultural material is prepared at the replenishment position. The replenishment position and replenishment amount of agricultural material can be displayed on an on-board display before actual work is performed. As a result, the cultivated land work vehicle can perform replenishment travel toward the replenishment position during a work travel, but JP 2020-110108A does not disclose a specific mode in which the replenishment travel is performed.

Preferred embodiments of the present invention provide cultivated land work vehicles that each perform autonomous travel so that the vehicle can be efficiently replenished with agricultural material during a work travel.

A cultivated land work vehicle according to a preferred embodiment of the present invention is a work vehicle to, while travelling autonomously along travel routes set in a cultivated land surrounded by a boundary area, supply agricultural material to the cultivated land, the cultivated land work vehicle including a travel route setter to set, as the travel routes, a peripheral travel route for circular or substantially circular travel in a peripheral area of the cultivated land, and a linear back-and-forth travel route for back-and-forth travel inward from the peripheral area, a vehicle position computer to compute a vehicle position of the cultivated land work vehicle, a travel controller to control travel of a body of the cultivated land work vehicle based on the vehicle position and the travel routes set as target routes, and a replenishment mode executor to execute a replenishment travel mode to replenish the cultivated land work vehicle with the agricultural material in the boundary area, during U-turn transition travel for transition from the back-and-forth travel route, which is a previous travel route, to the back-and-forth travel route, which is a next travel route, and provide the travel controller with a replenishment travel instruction.

The replenishment mode executor is operable to execute a first replenishment travel mode or a second replenishment travel mode depending on an arrangement of the travel routes in the cultivated land, in the first replenishment travel mode, the body performs reverse travel into the boundary area after reaching a starting point of the next travel route, and performs forward travel to the starting point of the next travel route after replenishment work is complete, and in the second replenishment travel mode, the body performs reverse travel into the boundary area before reaching the starting point of the next travel route, and performs forward travel to the starting point of the next travel route after the replenishment work is complete.

An agricultural material replenishment method for a cultivated land work vehicle includes travelling along a back-and-forth travel route, which is a previous travel route, determining whether a replenishment mode set in advance is a first replenishment travel mode or a second replenishment travel mode, and performing U-turn transition travel for transition from the previous travel route to the back-and-forth travel route, which is a next travel route, and replenishment travel for replenishment with the agricultural material, according to the determined replenishment mode, in the first replenishment travel mode, reverse travel into the boundary area is performed after a starting point of the next travel route is reached, and forward travel to the starting point of the next travel route is performed after replenishment work is complete, and in the second replenishment travel mode, reverse travel into the boundary area is performed before the starting point of the next travel route is reached, and forward travel to the starting point of the next travel route is performed after the replenishment work is complete.

With the above structure or method, if the cultivated land work vehicle needs to be replenished with agricultural material while travelling along the back-and-forth travel route, an appropriate mode is selected from two replenishment travel modes. One of the modes is the first replenishment travel mode. In this mode, the cultivated land work vehicle performs U-turn transition travel to travel from the ending point of the previous travel route to the starting point of the next travel route as planned, thereafter travels rearward into the boundary area of the cultivated land along an extension of the next travel route or along a line parallel to the extension, and stops. The cultivated land work vehicle stopped in the boundary area of the cultivated land can be replenished with agricultural material. After the replenishment work is complete, the cultivated land work vehicle travels directly to the starting point of the next travel route, and performs work travel along the next travel route as planned. In this first replenishment travel mode, before performing work travel along the next travel route subsequent to a normal U-turn transition travel, the cultivated land work vehicle travels rearward to the replenish point, and after replenishment is complete, the cultivated land work vehicle travels forward to enter the next travel route and performs work travel. Therefore, there is an advantage in that the control load for replenishment traveling is light. However, if the distance from the starting point of the next travel route to the boundary area of the cultivated land is long, there is a problem in that the cultivated land work vehicle wastes time travelling the distance rearward and forward. A replenishment travel mode prepared to solve this problem is the second replenishment travel mode. In this second replenishment travel mode, the cultivated land work vehicle stops partway of the U-turn transition travel starting from the ending point of the previous travel route, travels rearward into the boundary area of the cultivated land along an extension of the next travel route or along a line parallel to the extension, and stops. Replenishment work is performed in this area. After the replenishment work is complete, the cultivated land work vehicle travels to the starting point of the next travel route. Upon reaching the starting point of the next travel route, the cultivated land work vehicle performs work travel along the next travel route as planned. That is to say, in the second replenishment travel mode, the cultivated land work vehicle travels rearward to the boundary area during the U-turn transition travel, before reaching the starting point of the next travel route. Therefore, even if the distance from the starting point of the next travel route into the boundary area of the cultivated land is long, the wasteful forward and reverse travel distances are shorter than in the first replenishment travel mode.

If the cultivated land does not have a rectangular shape, but has an irregular shape, partway of the reverse travel toward the boundary area serving as the replenish point located ahead in the direction of travel of the vehicle, there may be a boundary area portion extending in the direction of travel of the vehicle, near a lateral side of the body of the vehicle. In such a case, it is preferable that the replenishment work is performed with the body of the vehicle parked alongside a boundary area portion extending in the direction of travel of the vehicle, rather than performed in the boundary area located ahead in the direction of travel of the vehicle. Therefore, in a preferred embodiment, wherein the replenishment mode executor is operable to execute a third replenishment travel mode depending on the arrangement of the travel routes in the cultivated land, and in the third replenishment travel mode, the body starts reverse travel to the boundary area partway through the U-turn transition travel, or starts reverse travel to the boundary area after reaching the starting point of the next travel route, and the replenishment work is performed partway through the reverse travel, and the body performs forward travel to the starting point of the next travel route after the replenishment work is complete.

Depending on the shape of the cultivated land and the type of work, the above-described first replenishment travel mode and the third replenishment travel mode may need to be performed preferentially. Therefore, another cultivated land work vehicle according to a preferred embodiment of the present invention is a cultivated land work vehicle to, while travelling autonomously along travel routes set in a cultivated land surrounded by a boundary area, supply agricultural material to the cultivated land, the cultivated land work vehicle including a travel route setter to set, as the travel routes, a peripheral travel route for circular travel in a peripheral area of the cultivated land, and a linear back-and-forth travel route for back-and-forth travel inward from the peripheral area, a vehicle position computer to compute a vehicle position of the cultivated land work vehicle, a travel controller to control travel of a body of the cultivated land work vehicle based on the vehicle position and the travel routes set as target routes, and a replenishment mode executor to execute a replenishment travel mode to replenish the cultivated land work vehicle with the agricultural material in the boundary area, during U-turn transition travel for transition from the back-and-forth travel route, which is a previous travel route, to the back-and-forth travel route, which is a next travel route, and provide the travel controller with a replenishment travel instruction, wherein the replenishment mode executor is operable to execute a first replenishment travel mode or a third replenishment travel mode depending on an arrangement of the travel routes in the cultivated land, in the first replenishment travel mode, the body performs reverse travel into the boundary area after reaching a starting point of the next travel route, and performs forward travel to the starting point of the next travel route after replenishment work is complete, and in the third replenishment travel mode, the body starts reverse travel to the boundary area partway through the U-turn transition travel, or starts reverse travel to the boundary area after reaching the starting point of the next travel route, and the replenishment work is performed partway through the reverse travel, and the body performs forward travel to the starting point of the next travel route after the replenishment work is complete.

Furthermore, depending on the shape of the cultivated land and the type of work, it may be preferable that replenishment travel is not performed to head for the replenishment point by performing reverse travel partway of U-turn transition travel or after U-turn transition travel is complete, but to head for the replenishment point by further performing forward travel after the reverse travel is complete. Therefore, in a preferred embodiment, the replenishment mode executor is operable to execute a fourth replenishment travel mode depending on the arrangement of the travel routes in the cultivated land, in the fourth replenishment travel mode, the replenishment work is performed partway through the forward travel to the starting point of the next travel route started after the reverse travel performed in the U-turn transition travel, and the body performs forward travel to the starting point of the next travel route after the replenishment work is complete.

The route of U-turn transition travel, the route to the replenishment point, and the route from the replenishment point to the starting point of the next travel route are obtained based on the mutual positional relationship between the boundary area in which the replenishment point is set, the ending point of the previous travel route, and the starting point of the next travel route, on the condition that the steering is feasible and travel is less wasteful. Therefore, in a preferred embodiment, the replenishment mode executor is operable to perform one of the replenishment travel modes depending on the mutual positional relationship between the boundary area in which the replenishment point is set, the ending point of the previous travel route, and the starting point of the next travel route.

The second replenishment travel mode is a mode for reducing wasteful travel between the starting point of the next travel route and the boundary area in which the replenishment point is set, which may occur when the first replenishment travel mode is executed, and if the distance between the starting point of the next travel route and the boundary area is short, the second replenishment travel mode is less effective. In addition, in the first replenishment travel mode, the entire U-turn transition travel without normal replenishment is reused as it is, and the back-and-forth travel between the starting point of the next travel route and the boundary area in which the replenishment point is set is used as replenishment travel, and therefore travel control for the first replenishment travel mode is easy. Therefore, the first replenishment travel mode is preferable if there is little wasteful travel. For this reason, in a preferred embodiment, if a distance between the boundary area in which a replenishment point is set and the starting point of the next travel route is shorter than or equal to a predetermined distance, the replenishment mode executor is operable to execute the first replenishment travel mode, and if the distance is longer than the predetermined distance, the replenishment mode executor is operable to execute the second replenishment travel mode. Furthermore, when the selection is made considering the difference between the first replenishment travel mode and the second replenishment travel mode more specifically, if the distance between the boundary area in which the replenishment point is set and the starting point of the next travel route is slightly longer than a distance between the boundary area and the ending point of the previous travel route, the replenishment mode executor is operable to preferably execute the first replenishment travel mode, and if the distance between the boundary area in which the replenishment point is set and the starting point of the next travel route is considerably longer than the distance between the boundary area and the ending point of the previous travel route, the replenishment mode executor is operable to preferably execute the second replenishment travel mode. Alternatively, if a distance between the boundary area in which a replenishment point is set and the starting point of the next travel route is shorter than or equal to a predetermined distance, the replenishment mode executor is operable to execute the first replenishment travel mode, and if the distance between the boundary area in which the replenishment point is set and the starting point of the next travel route is longer than the predetermined distance and the distance between the boundary area in which the replenishment point is set and the starting point of the next travel route is longer than the distance between the boundary area and an ending point of the previous travel route by a determination distance, the replenishment mode executor is operable to execute the second replenishment travel mode. This determination distance is determined based on how long wasteful travel distance is acceptable.

The replenishment travel mode for replenishment with agricultural material in the boundary area is executed in U-turn transition travel that connects the ending point of the previous travel route and the ending point of the next travel route. Therefore, the replenishment mode executor needs to know that replenishment with agricultural material is required, immediately after or before the start of U-turn transition travel. For this reason, in a preferred embodiment, the previous travel route in which replenishment with the agricultural material is presumed to be required is given a replenishment flag, and the replenishment travel mode is executed in the U-turn transition travel performed from the ending point of the previous travel route to which the replenishment flag is given. With this configuration, the replenishment mode executor is operable to check whether or not a replenishment flag is given to the previous travel route, so that the replenishment mode executor can recognize whether or not the replenishment travel mode is to be executed in U-turn transition travel from the previous travel route to the next travel route. When the travel route setter sets travel routes, if the travel order of the travel routes is also determined, a travel route in which replenishment with agricultural material is required can be computed. Therefore, it is possible to give a replenishment flag to the previous travel route that is the aforementioned travel route. Alternatively, if the amount of agricultural material consumed per unit travel has been set, the timing of replenishment with agricultural material can be computed from the traveled distance, and the replenishment flag can be given to the previous travel route to be travelled when replenishment is required.

In U-turn transition travel, it is possible to leave the previous travel route by simple steering control, but entering the next travel route requires high-precision steering control. At that time, in order for the body of the vehicle to smoothly reach the starting point of the next travel route, it is convenient if an arc, which is easy to compute, is used as a target route. For this reason, in a preferred embodiment, a tangent line from the body to a virtual turning circle set near the starting point of the next travel route, and the virtual turning circle, are used as the target routes for the U-turn transition travel. With this configuration, even when the vehicle enters the target route, which is an arc (virtual turning circle), the tangential line from the cultivated land work vehicle to the arc is used, so that the vehicle can smoothly enter the target route. In addition, in order for the vehicle to reach the starting point of the next travel route in a stable posture, it is preferable that the virtual turning circle is set so that the circle touches an extension line of the next travel route rather than the starting point thereof. Furthermore, if the radius of a virtual turning circle that matches the conditions of the cultivated land or the steering characteristics of the cultivated land work vehicle is set, more smooth U-turn transition travel can be realized.

If the cultivated land does not have a rectangular shape, but has an irregular shape, a tangent line (linear target route) used to enter the virtual turning circle during U-turn transition travel may intersect the boundary area. In such a case, when the possibility of the body of the vehicle actually interfering with (entering) the boundary area is detected, an emergency stop is performed and autonomous travel stops. To avoid such an emergency, in a preferred embodiment, in response to the tangent line extending through the boundary area, interference avoidance travel is performed to prevent the body from intersecting with the boundary area. Specifically, the cultivated land work vehicle travels parallel to the boundary area until the tangent line does not extend through the boundary area.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 23 is a schematic diagram showing Application Example 11 of the various application examples of U-turn transition travel accompanied by replenishment travel.

DETAILED DESCRIPTION OF THE PREFERRED EMBODIMENTS

Figure 1:
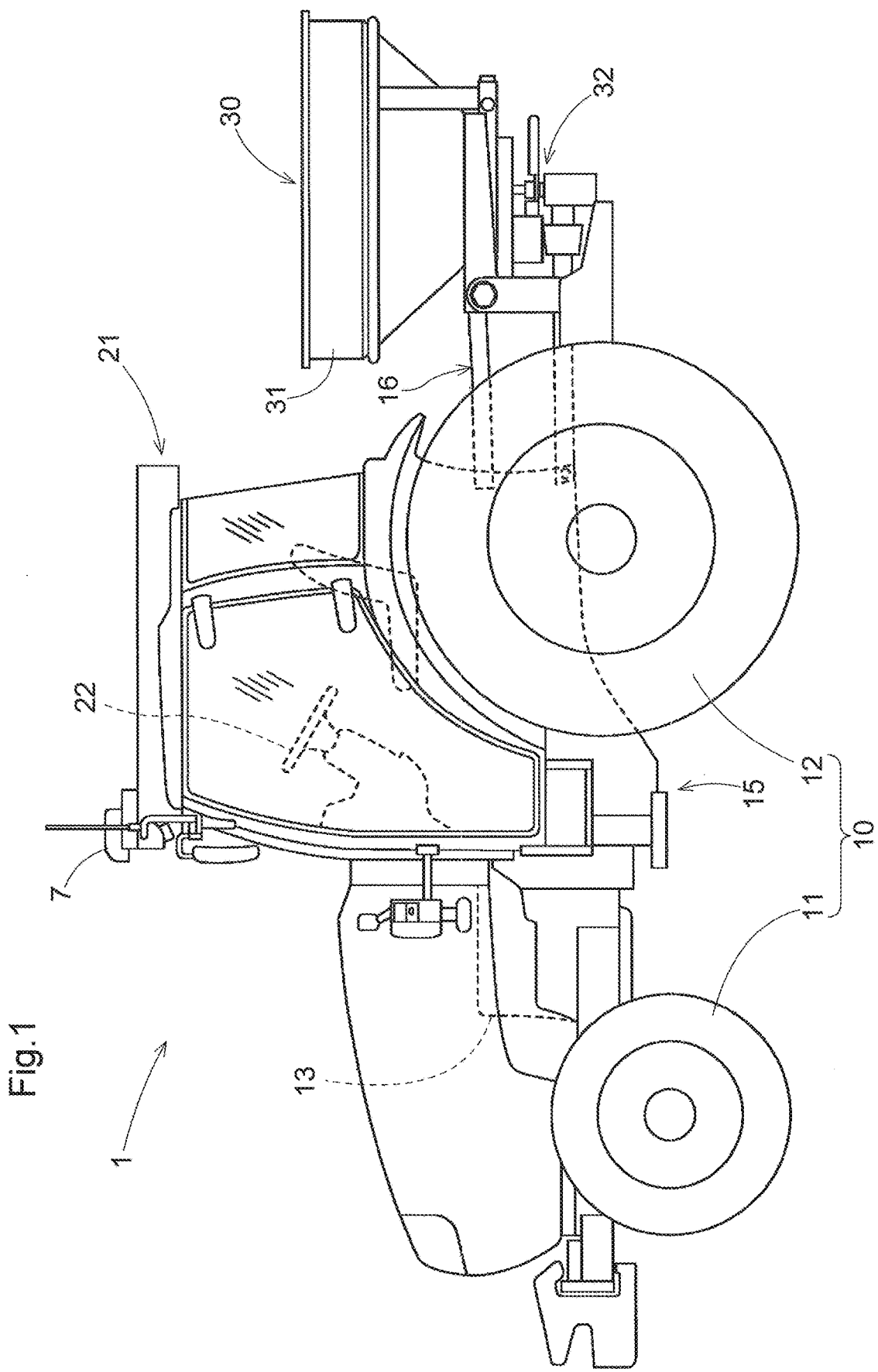
FIG. 1 is a side view of a tractor, which is an example of a cultivated land work vehicle.

Preferred embodiments of cultivated land work vehicles to perform autonomous travel according to the present invention are explained using drawings. FIG. 1 is a side view of a tractor, which is an example of such a cultivated land work vehicle. As shown in FIG. 1, the tractor includes a body 1 of the tractor supported above the ground by a travel device 10, a prime mover 13, and a transmission 15. The travel device 10 includes front wheels 11 and rear wheels 12. The front wheels 11 may be of a tire type or a crawler type. Similarly, the rear wheels 12 may be of a tire type or a crawler type. The prime mover 13 may be a diesel engine, an electric motor, or the like. The transmission 15 is configured to adjust the propulsion force of the travel device 10 through gear shifting, and switch between forward travel and reverse travel of the travel device 10. The body 1 of the tractor is provided with a cabin 21, and a driver compartment is formed in the cabin 21.

A rear section of the body 1 of the tractor is provided with an elevating device 16 including a three-point link mechanism or the like. The elevating device 16 is equipped with a work device 30. Examples of the work device 30 include a fertilizer spraying device for spraying fertilizer, a pesticide spraying device for spraying pesticide, a seedling transplanting device for transplanting seedlings, a sowing device for sowing seeds, and so on. Fertilizer, pesticide, seedlings, seeds, or the like correspond to the agricultural material supplied by the working device 30 to the cultivated land.

This work device 30 includes a container 31 that can store agricultural material and a supply mechanism 32 to supply the agricultural material stored in the container 31 to the cultivated land. The amount and width of agricultural material to be supplied by the supply mechanism 32 are adjustable. By linking this adjustment with the vehicle speed, it is possible to control the unit supply amount, which is the supply amount per unit travel distance (unit travel time).

The front wheels 11 function as steering wheels, and the direction in which the tractor travels is changed by changing the steering angle thereof. Alternatively, the direction in which the tractor travels may be changed by changing the speed difference between the left and right wheels of the travel device 10. In this preferred embodiment, the steering angle of the front wheels 11 in autonomous travel can be changed with use of an electric steering mechanism (not shown). Steering of the front wheels 11 in manual travel is performed by operating a steering wheel 22, which is provided in the driver compartment. To realize a vehicle position detection function, the tractor is provided with a satellite positioning module 7 as a positioning module in the ceiling area of the cabin 21. The satellite positioning module 7 includes a satellite antenna to receive a satellite positioning signal such as a GNSS signal. Note that the satellite positioning module 7 may include an inertial navigation module incorporating a gyro-accelerometer and magnetic orientation sensor to complement satellite navigation. Of course, the inertial navigation module may be located separately from the satellite positioning module 7. Note that the position of the body of the vehicle here means the position of a specific portion of the tractor, including the working device 30, and may be more than one.

Figure 2:
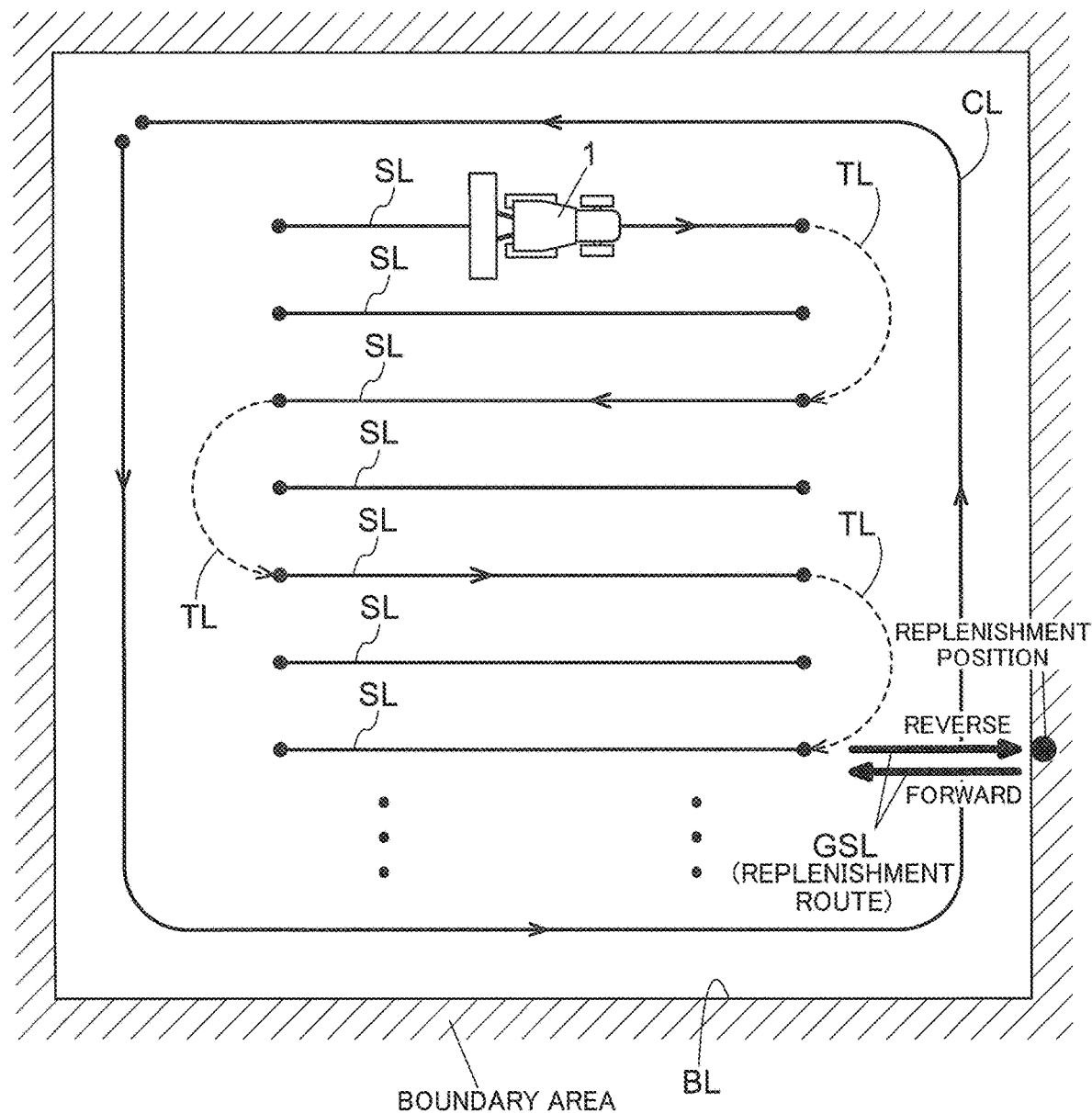
FIG. 2 is a schematic diagram showing some travel routes including replenishment routes for the tractor, which travels autonomously.

FIG. 2 schematically shows simplified work travel and replenishment travel of the tractor in the cultivated land. The cultivated land is surrounded by a boundary area including ridges, farm road walls, etc., and therefore prohibited boundary lines BL, which prohibit the tractor from entering the cultivated land, are the inner boundary lines of the boundary area. The positions of the prohibited boundary lines BL can be acquired based on the vehicle positions (travel trajectory) successively computed from the positioning data acquired by the satellite positioning module 7 while the tractor is performing circular travel along the boundary area. The route of this circular travel is a peripheral travel route CL, and a peripheral area is formed by this circular travel. Note that the sampling of the position of the tractor for computing the route of the circular travel may be automatically performed by a computer, or may be performed manually through a driver's optional operation.

Once a contour area of the cultivated land defined by the prohibited boundary lines BL is determined, a travel route for work travel to be performed inward from this contour area is computed. At this time, a replenishment point where the tractor stops to be replenished with agricultural material can be set in the boundary area. The replenishment point may be a replenishment area with a predetermined length. In the example shown in FIG. 2, the tractor repeats linear travel along a linear travel route (indicated by a reference sign SL in FIG. 2), which is a back-and-forth travel route, and U-turn transition travel (the route thereof is indicated by a reference sign TL in FIG. 2) for transition from one linear travel route (a previous travel route Ls shown in FIG. 3) to another linear travel route (a next travel route Ln shown in FIG. 3). Generally, U-turn transition travel is performed between one or more linear travel routes, but may also be travel that connects adjacent linear travel routes. Replenishment travel for replenishing the tractor with agricultural material in the boundary area (the route thereof is indicated by a reference sign GSL in FIG. 2) is mainly performed at the end of U-turn transition travel or partway thereof. The replenishment travel includes reverse travel and forward travel, and the tractor stops at a suitable location for performing replenishment work at the replenish point. The U-turn transition travel according to a preferred embodiment of the present invention does not mean strict 180-degree direction change travel, but rather a direction change for transition from one linear travel route to another linear travel route, and includes travel for a direction change other than a 180-degree direction change.

Figure 3:
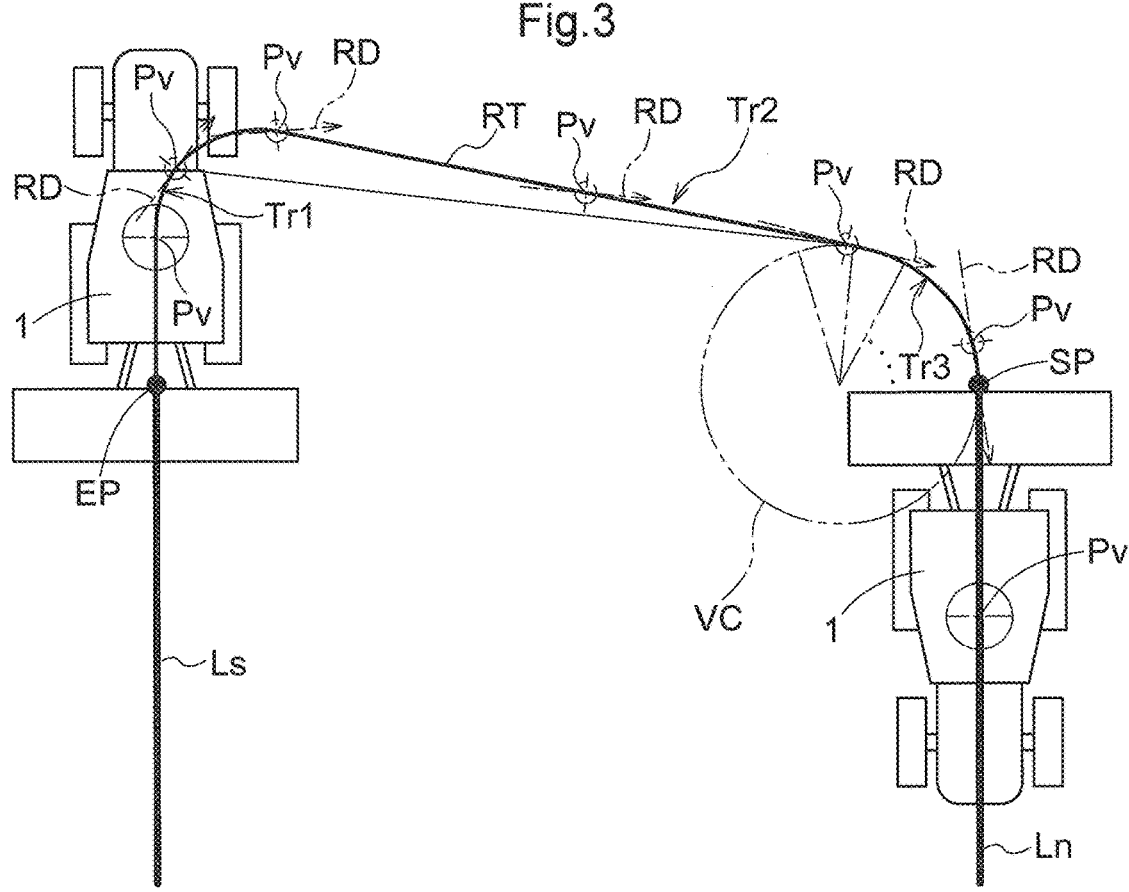
FIG. 3 is a schematic diagram showing movement of the tractor in basic turning travel from a previous travel route to a next travel route.
Figure 4:
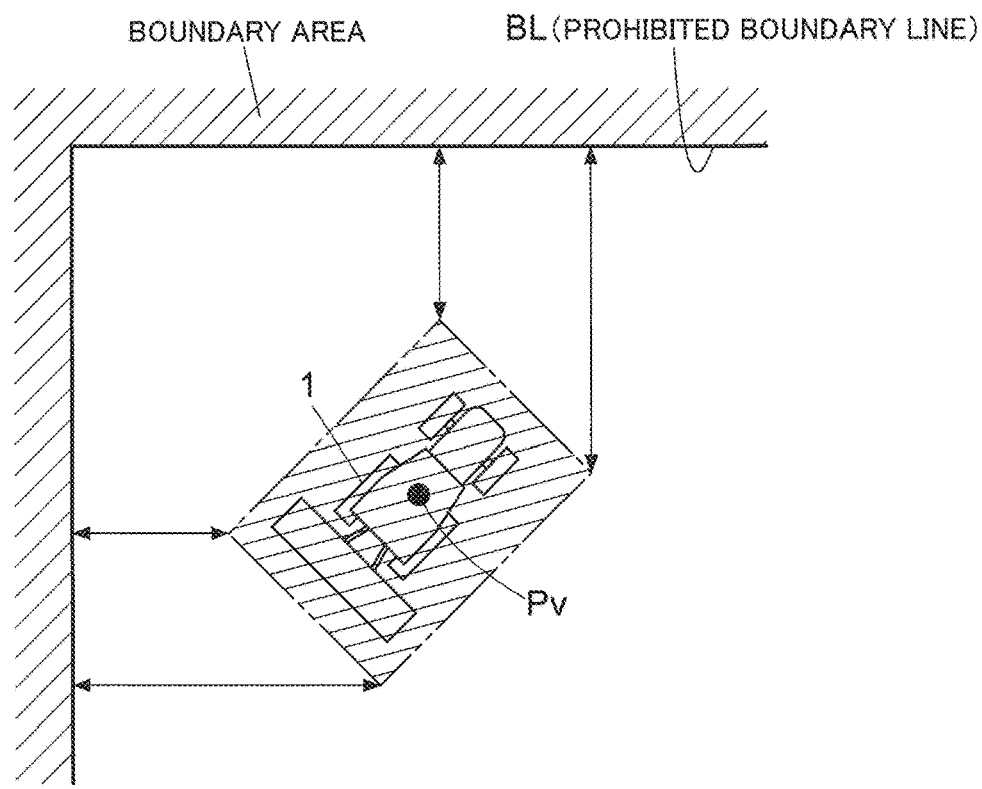
FIG. 4 illustrates a positional relationship between prohibited boundary lines and the tractor.

The tractor is provided with the satellite positioning module 7, and therefore the tractor can compute the map coordinates (e.g., earth coordinates or cultivated land coordinates) of any point on the body 1 of the tractor, such as a vehicle body reference point Pv (see FIG. 3). To detect the positional relationship between the tractor and the prohibited boundary lines BL, distances between the tractor and the prohibited boundary lines BL are computed as shown in FIG. 4. In this example, the tractor is shown as a rectangle of a predetermined size (a rectangle surrounding the contour of the tractor), and the lengths of the vertical lines drawn from the corners of the rectangle to the prohibited boundary lines BL are computed as the distances from the corners of the rectangle to the prohibited boundary lines BL. In FIG. 4, the shortest distance to the horizontal prohibited boundary line BL is the distance from the front left corner to the prohibited boundary BL, and the shortest distance to the vertical prohibited boundary BL is the distance from the rear left corner to the prohibited boundary BL. The map coordinates of each corner are computed from the map coordinates of the vehicle body reference point Pv.

FIG. 3 schematically shows a basic example of U-turn transition travel with automatic steering. In this example, simple turning travel for transition from the ending point (marked with a reference sign EP in FIG. 3) of the linear travel route (transition origin) indicated by the reference sign Ls to the starting point (marked with a reference sign SP in FIG. 3) of the linear travel route (transition destination) indicated by the reference sign Ln. In the present application, the linear travel route that is the transition origin is set as the previous travel route Ls, and the linear travel routes that is the transition destination is set as the next travel route Ln.

Upon reaching the ending point of the previous travel route Ls, the tractor performs leaving turning travel to leave the previous travel route Ls and head for the next travel route Ln. The travel trajectory of this leaving turning travel is indicated by Tr1. In the example in FIG. 3, the tractor travels linearly until the work device 30 (see FIG. 1) passes the ending point of the previous travel route Ls.

The leaving turning travel to leave the previous travel route Ls is performed at a steering angle set in advance, and transitions to tangent line following travel partway of the leaving turning travel. A virtual turning circle VC, which is tangential to the next travel route Ln on the previous travel route Ls side of the next travel route Ln, is set at the starting point of the next travel route Ln or a position near the starting point on an extension of the next travel route Ln. The tangent line from the vehicle body reference point Pv of the tractor, which is performing leaving turning travel, to the virtual turning circle VC, is computed. Here, the vehicle body reference point Pv is substantially the center point of the tractor, but may be set at any position. The orientation of the line passing through the vehicle body reference point Pv and extending in the direction of travel of the tractor is the travel orientation. The tractor performs tangent line following travel with the orientation of the computed tangent set as the target orientation. During the tangent line following travel, if the angle defined by the computed tangent line and the travel orientation falls within a predetermined angle, the tangent line is set as a reference tangent line RT. After the reference tangent line RT is set, the tractor sets the reference tangent line RT as a transition target route and the virtual turning circle VC as a turning target route, and performs entry turning travel to enter the next travel route Ln. A travel trajectory with the reference tangent line RT set as the transition target route is shown in FIG. 3 as Tr2. When travel along the transition target route progresses and the vehicle body reference point Pv of the tractor approaches the virtual turning circle VC, the tractor starts arc turning travel, which is travel along the virtual turning circle VC. The travel trajectory of final turning travel is indicated by Tr3. When the arc turning travel progresses and the vehicle body reference point Pv of the tractor reaches the starting point of the next travel route Ln or an extension of the next travel route Ln extending from the starting point, the tractor terminates the arc turning travel and starts linear travel toward the next travel route Ln or the extension set as the target route.

Figure 5:
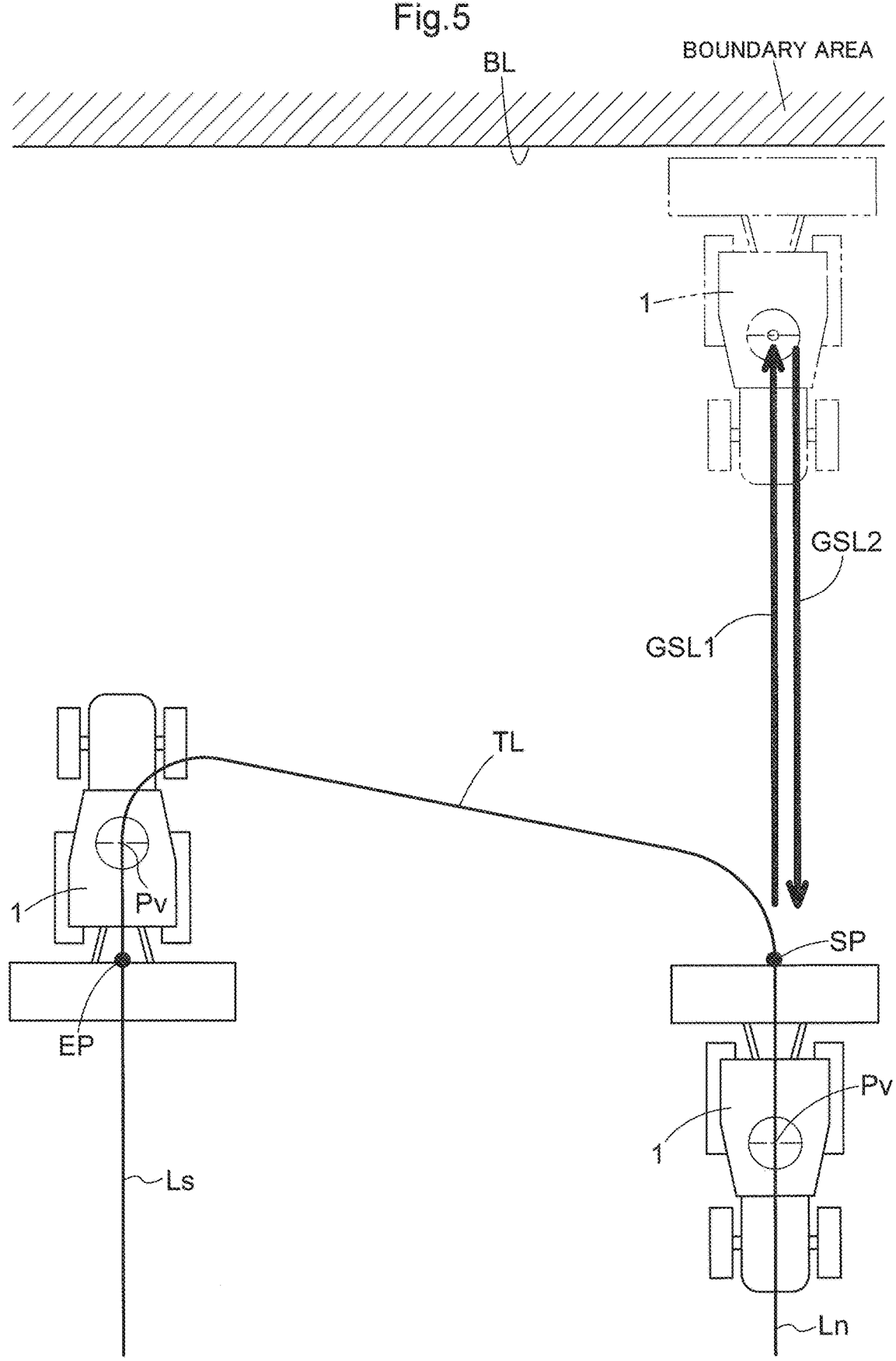
FIG. 5 is a schematic diagram showing movement of the tractor in U-turn transition travel accompanied by replenishment travel.

FIG. 5 schematically shows a basic example of replenishment travel performed by the tractor to be replenished with agricultural material in the boundary area after terminating the U-turn transition travel. In this example, when the U-turn transition travel is terminated and the body 1 of the tractor is in a suitable orientation for work travel to be performed along the next travel route Ln, the tractor stops temporarily and thereafter travels rearward into the boundary area along an extension of the next travel route Ln. This reverse route, which is a reverse replenishment route, is marked with a reference sign GSL1 in FIG. 5. When the work device 30 is pulled over to the boundary area, agricultural material replenishment work is performed. Note that such reverse travel of the body 1 of the tractor, which makes the rear section (the work device 30) of the body 1 of the tractor face the boundary area, is referred to as vertical pull-over. After replenishment work is complete, the tractor travels forward along a forward replenishment route. This forward route, which is a forward replenishment route, is marked with a reference sign GSL2 in FIG. 5. Upon reaching the starting point of the next travel route Ln, the tractor starts work travel along the next travel route Ln. Such replenishment travel can be realized under simple travel control because the tractor need only perform linear reverse and forward travel along an extension of the next travel route Ln.

Next, U-turn transition travel that is performed to avoid a protrusion from a prohibited boundary line BL that faces the ending point of the previous travel route Ls and the starting point of the next travel route Ln will be described. As is clear from FIG. 6, the tangent line drawn from the vehicle body reference point Pv of the body 1 of the tractor, which has passed the ending point of the previous travel route Ls, to the virtual turning circle VC intersects the protrusion of the prohibited boundary line BL. Therefore, in the mode of the boundary area shown in FIG. 6, if the tractor performs the transition travel shown in FIG. 3, the tractor is interfered with by the prohibited boundary line BL. To avoid such interference, the tractor performs interference avoidance travel, which is performed to avoid interference with the prohibited boundary line BL. Hereinafter, the prohibited boundary line BL that interferes with the tractor is referred to as the interfering boundary line.

Figure 6:
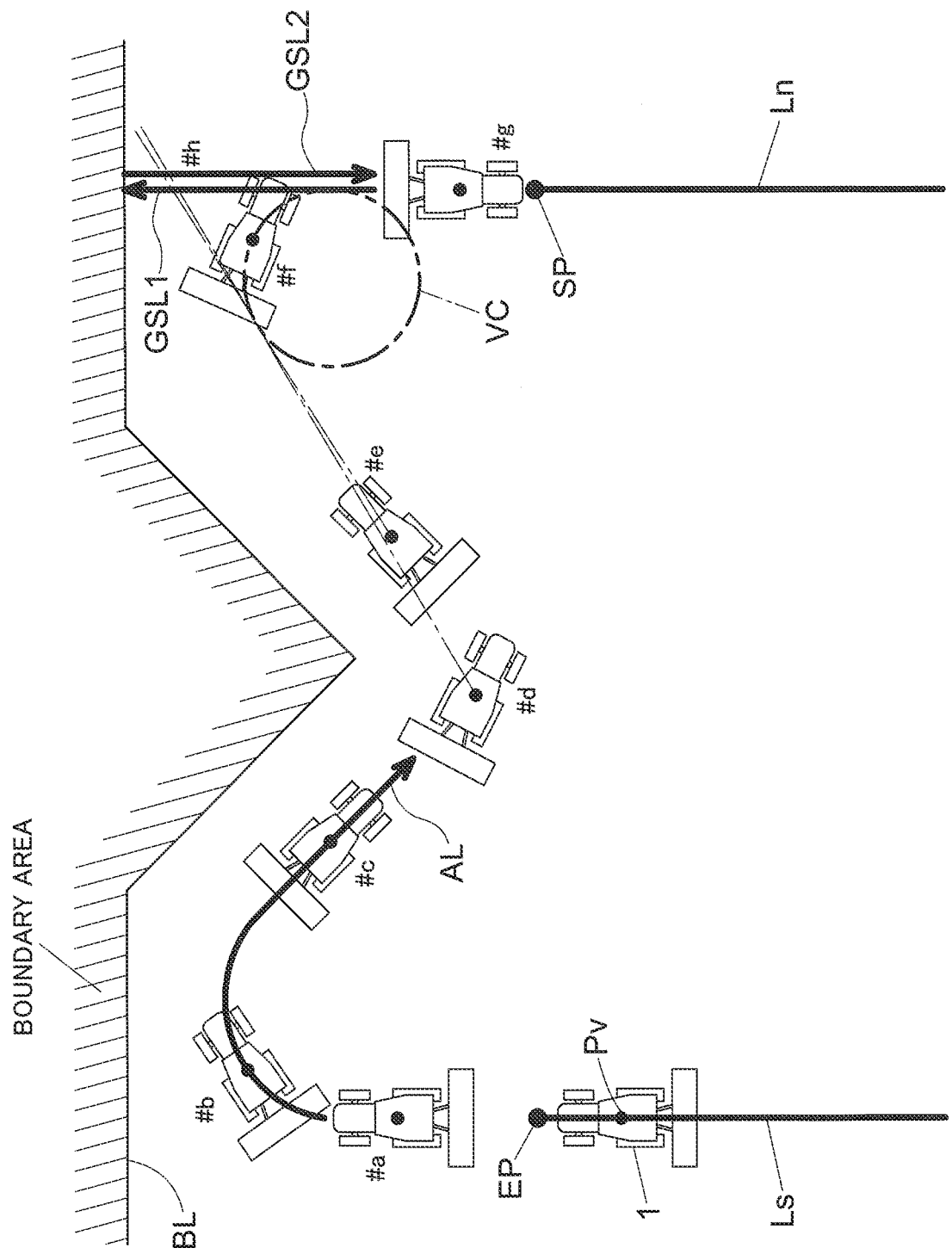
FIG. 6 is a schematic diagram showing movement of the tractor in U-turn transition travel that includes interference avoidance travel, and replenishment travel.

FIG. 6 shows the movement of the body 1 of the tractor performing U-turn transition travel accompanied by this interference avoidance travel. After passing the ending point of the previous travel route Ls, the tractor starts leaving turning travel toward the virtual turning circle VC set near the starting point of the next travel route Ln (#a). An interfering boundary line is present in the direction toward the virtual turning circle VC from the body 1 of the tractor that has started leaving turning travel (#b). Therefore, an interference avoidance route AL is set to avoid interference with the interfering boundary line. The interference avoidance route AL is a travel route that extends with a distance from the interfering boundary line, required for safe travel. Substantially, the interference avoidance route AL is parallel to the prohibited boundary line BL. In interference avoidance travel, the tractor performs autonomous travel along the interference avoidance route AL set as the travel target route (#c).

After completing the interference avoidance route AL, the tractor turns toward the virtual turning circle VC (#d) and performs tangent line following travel toward the virtual turning circle VC (#e). Thereafter, upon reaching the virtual turning circle VC, the tractor performs turning travel along the virtual turning circle VC set as the turning target route (#f), and reaches the starting point of the next travel route Ln or a point near the starting point (#g). Thereafter, the tractor performs replenishment travel including reverse travel before replenishment and forward travel after replenishment, and is replenished with agricultural material (#h).

Figure 7A:
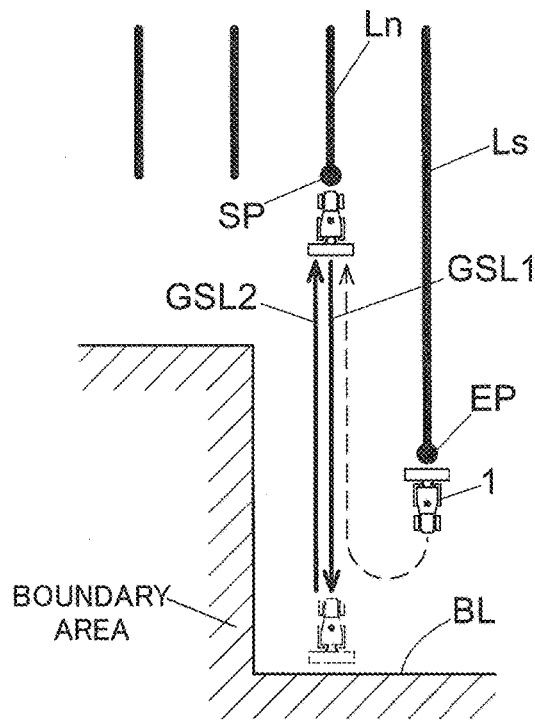
FIGS. 7A and 7B are schematic diagrams comparing a first replenishment travel mode and a second replenishment travel mode.
Figure 7B:
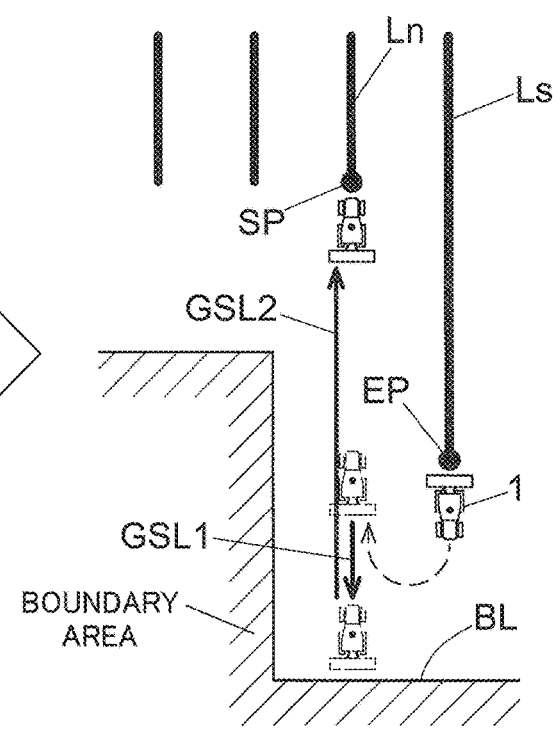

FIGS. 7A and 7B show two examples of U-turn transition travel accompanied by replenishment travel, performed in a boundary area with a step. The replenishment travel accompanying the U-turn transition travel shown in the travel example in FIG. 7A is the same as those shown in FIGS. 5 and 6, and is basic replenishment travel referred to as a first replenishment travel mode. The replenishment travel accompanying the U-turn transition travel shown in the travel example in FIG. 7B is replenishment travel referred to as a second replenishment travel mode. The selection condition for selecting the second replenishment travel mode in this preferred embodiment is that the distance between the boundary area where the replenishment point is set and the starting point of the next travel route Ln is longer than a first predetermined distance that can be set in advance, and the distance between the boundary area where the replenishment point is set and the starting point of the next travel route Ln is longer than the distance between the boundary area and the ending point of the previous travel route Ls by more than a second predetermined distance (determination distance). If this selection condition is satisfied, the second replenishment travel mode is executed.

As is clear from the travel example in FIG. 7A, in the first replenishment travel mode, the tractor performs U-turn transition travel from the ending point of the previous travel route Ls and reaches the starting point of the next travel route Ln. Furthermore, the tractor starts replenishment travel from the starting point of the next travel route Ln, performs reverse travel toward the boundary area along an extension of the next travel route Ln, and stops at the stopping position before the boundary area. Replenishment work is performed while the tractor is stopped. After replenishment work is complete, the tractor travels forward toward the starting point of the next travel route Ln along an extension of the next travel route Ln. Replenishment travel is complete when the tractor reaches the starting point of the next travel route Ln, and the tractor starts work travel along the next travel route Ln.

In this first replenishment travel mode, as is clear from the travel example in FIG. 7A, if the distance between the boundary area where the replenishment point is set and the starting point of the next travel route Ln is longer than a distance between the boundary area and the ending point of the previous travel route Ls, travel for the difference in distance between the ending point of the previous travel route Ls and the starting point of the next travel route Ln in the direction in which the routes extend will be wasteful in both forward and reverse travel in replenishment travel. This wasteful travel can be avoided with use of the second replenishment travel mode shown in the travel example in FIG. 7B.

In the second replenishment travel mode, the tractor performs U-turn transition travel from the ending point of the previous travel route Ls, and starts replenishment travel when reaching an extension of the previous travel route Ls, before reaching the starting point of the next travel route Ln. The tractor performs reverse travel toward the boundary area along an extension of the next travel route Ln, and stops at the stopping position before the boundary area. Replenishment work is performed while the tractor is stopped. After replenishment work is complete, as in the first replenishment travel mode, the tractor travels forward toward the starting point of the next travel route Ln along an extension of the next travel route Ln. Replenishment travel is complete when the tractor reaches the starting point of the next travel route Ln, and the tractor starts work travel along the next travel route Ln. That is to say, in the second replenishment travel mode, upon reaching an extension of the next travel route Ln, the tractor starts replenishment travel from that point, instead of travelling to the starting point of the next travel route Ln. The tractor travels rearward into the boundary area, and travels forward to the starting point of the next travel route Ln after replenishment work is complete. As is clear from FIGS. 7A and 7B, the distance from the ending point of the previous travel route Ls to the stopping position for replenishment is shorter in the second replenishment travel mode than in the first replenishment travel mode.

Figure 8A:
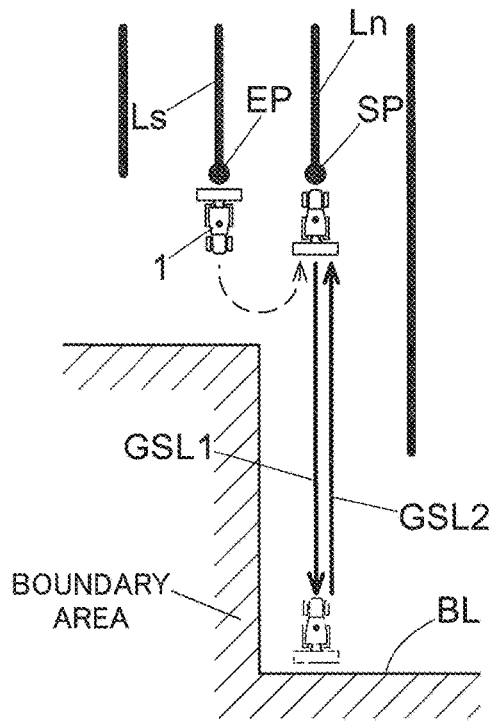
FIGS. 8A and 8B are schematic diagrams comparing the first replenishment travel mode and a third replenishment travel mode.
Figure 8B:
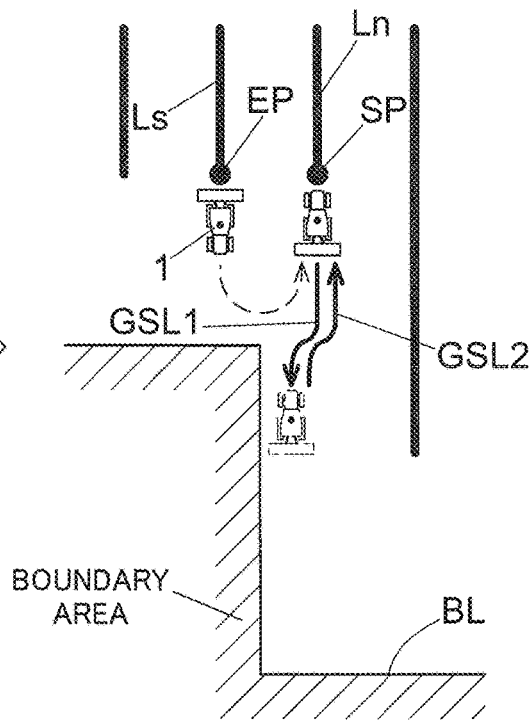

FIGS. 8A and 8B show two examples of U-turn transition travel accompanied by replenishment travel, performed in a boundary area with a step. The travel example in FIG. 8A shows the first replenishment travel mode in which replenishment travel is performed after U-turn transition travel is completed, and the travel example in FIG. 8B shows the third replenishment travel mode. In the third replenishment travel mode, replenishment work is performed partway of reverse travel to the boundary area performed after the tractor reaches the starting point of the next travel route Ln, and the tractor travels forward to the starting point of the next travel route Ln after replenishment work is complete.

In the third replenishment travel mode, as shown in the travel example in FIG. 8B, the tractor performs U-turn transition travel from the ending point of the previous travel route Ls, and reaches the starting point of the next travel route Ln. Next, the tractor starts replenishment travel from the starting point of the next travel route Ln. However, unlike in the first travel mode, the tractor does not travel rearward into the boundary area located ahead along an extension of the next travel route Ln. In this example, the boundary area with a step includes a boundary area portion extending substantially parallel to an extension of the next travel route Ln, and it is assumed that replenishment work can be performed in the boundary area portion. Therefore, the tractor is parked alongside this boundary area portion partway of reverse travel performed along the reverse replenishment route given a reference sign GSL1 in FIGS. 8A and 8B. Replenishment work is performed at this stopping position, from a lateral side of the tractor. When replenishment work is complete, the tractor travels forward along a forward replenishment route (with a reference sign GSL2 in FIGS. 8A and 8B) that is substantially the same as the reverse replenishment route, toward the starting point of the next travel route Ln. Replenishment travel is complete when the tractor reaches the starting point of the next travel route Ln, and the tractor starts work travel along the next travel route Ln.

Note that, if the distance between the prohibited boundary line BL extending substantially parallel to an extension of the next travel route Ln and an extension of the next travel route Ln is long, pull-over steering is performed in the reverse replenishment route GSL1, to pull over the tractor to the prohibited boundary line BL. This pull-over steering may be performed manually with use of a remote control or the like.

The selection of the replenishment travel mode, such as the first replenishment travel mode, the second replenishment travel mode, or the third replenishment travel mode, is determined based on the mutual positioning of the boundary area where the replenishment point is set, the ending point of the previous travel route Ls, and the starting point of the next travel route Ln, i.e., the arrangement of the back-and-forth travel route in the cultivated land.

Figure 9:
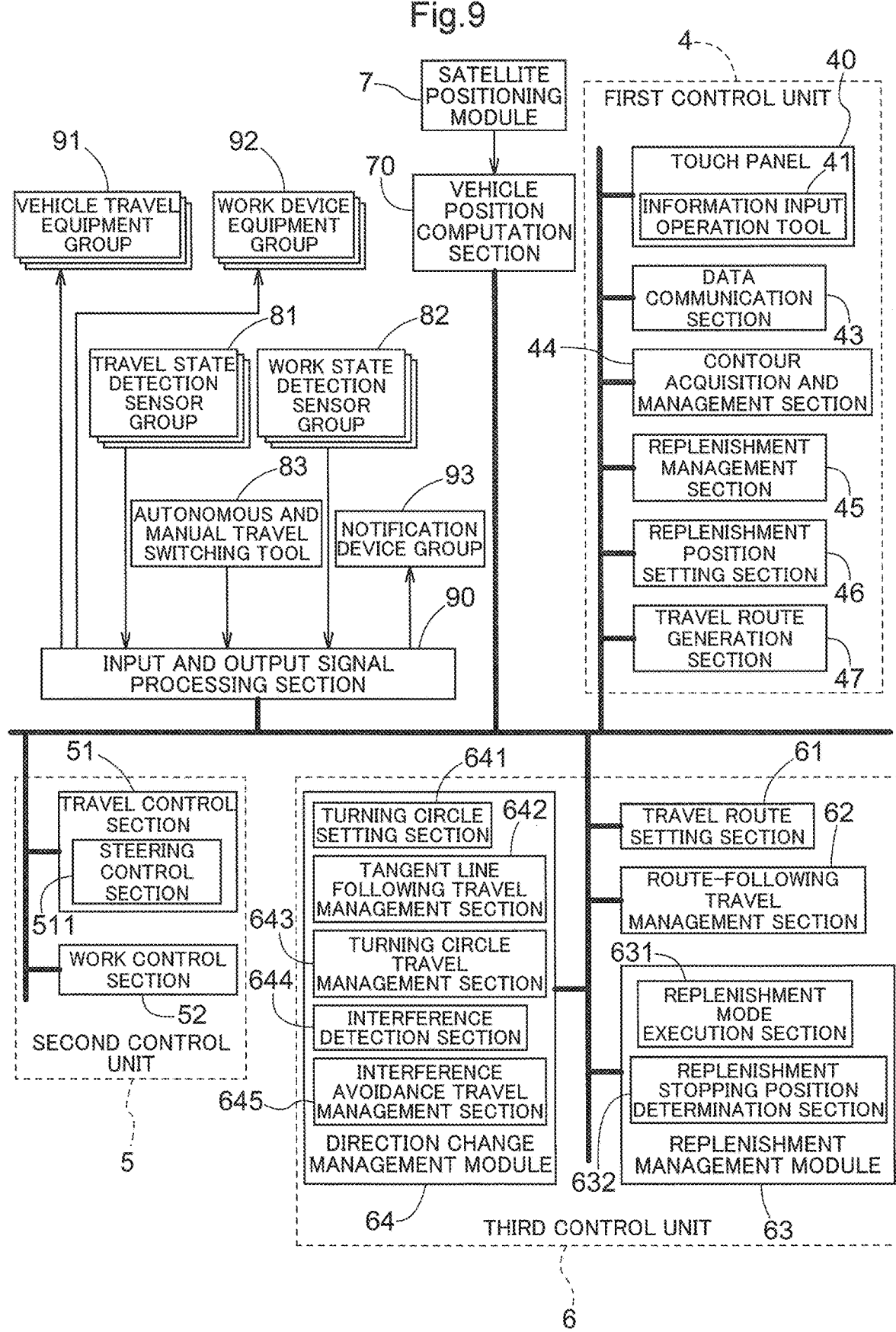
FIG. 9 is a functional block diagram related to autonomous travel of the tractor, including replenishment travel.

The control system for controlling the autonomous travel of the above tractor will be described. FIG. 9 shows a functional block diagram showing an autonomous travel control system for the tractor. This control system includes a first control unit 4 with a user interface, a second control unit 5 to control various kinds of control equipment in the body 1 of the tractor, and a third control unit 6 to mainly control U-turn transition travel and replenishment travel, and an input and output signal processing section 90. The first control unit 4, the second control unit 5, the third control unit 6, and the input and output signal processing section 90 are connected to each other by an on-board LAN, a control signal line, or the like so that data can be transmitted therebetween. The first control unit 4 is a tablet computer with a touch panel 40 and is provided in the driver compartment. The first control unit 4 can be taken out of the driver component, and can be used outside the tractor by, for example, an operator in the boundary area, connecting the first control unit 4 to an on-board LAN via wireless communication.

The input and output signal processing section 90, which functions as an input and output interface, has the function of connecting to data and signal lines, an on-board LAN, a wireless communication line, and a wired communication line. A vehicle travel equipment group 91, a work device equipment group 92, a notification device 93, and so on are connected to the first control unit 4 and the second control unit 5 via the input and output signal processing section 90. Therefore, the input and output signal processing section 90 has, for example, an output signal processing function, an input signal processing function, a communication function for transmitting data via data and signal lines, a wireless line, a wired line, and so on. The vehicle travel equipment group 91 includes steering equipment that is included in an electric steering mechanism, engine control equipment, transmission operation equipment, and so on. The work device equipment group 92 includes a clutch for transmitting power to the work device 30, equipment for adjusting the width and amount of material to be supplied, and so on. The notification device 93 includes a meter, a buzzer, a lamp, a liquid crystal display, and so on. Furthermore, switches and buttons, such as a travel state detection sensor group 81, a work state detection sensor group 82, and an autonomous and manual travel switching tool 83, are connected to the input and output signal processing section 90.

The positioning data acquired by the satellite positioning module 7 described above is processed by a vehicle position computation section 70, and the position of the tractor in map coordinates or cultivated land coordinates of a predetermined location is output as the vehicle position.

The first control unit 4 includes the touch panel 40, a data communication section 43, a contour acquisition and management section 44, a replenishment management section 45, a replenishment position setting section 46, and a travel route generation section 47. The first control unit 4 can receive various operations input by the driver, and notify the driver of various kinds of information, through the touch panel 40. The user inputs operations with the use of information input operation tools 41 including a software switch, a hardware switch, and the so on. The data communication section 43 acquires work travel information, including the position of the cultivated land that is a work site, the type of work to be performed in the cultivated land, and so on, from an external computer or storage medium. Information such as the amount of the agricultural material stored and the amount and width of the agricultural material to be supplied are managed by the replenishment management section 45.

The data communication section 43 communicates with a remote cloud service or the like, and communicates with the tractor's on-board LAN when the first control unit 4 is taken out of the driver's compartment, for example. Therefore, the first control unit 4 can be used as a remote control to remotely operate the tractor.

The contour acquisition and management section 44 determines the contour of the cultivated land based on the trajectory acquired by the tractor that has entered the cultivated land surrounded by the boundary area including farm roads, ridges, and so on, performing circular travel along the inner boundary line of the boundary area. Note that the contour acquisition and management section 44 can also use the contour of the cultivated land acquired through cultivated land work or the like performed in advance.

The contour acquisition and management section 44 sets a prohibited boundary line BL that prohibits entry of the tractor, based on cultivated land contour information. Note that, when the cultivated land includes areas where the body 1 of the tractor is prohibited from entering, such as a steel tower or a water facility, the contour acquisition and management section 44 can also set the boundary lines of such areas as prohibited boundary line BL.

The travel route generation section 47 references cultivated land information such as information regarding the contour of the cultivated land, and executes a pre-installed travel route generation program to generate a travel route and a virtual turning circle VC. Note that the travel route generation section 47 can also receive and manage externally generated travel routes.

The replenishment position setting section 46 sets the replenishment position for replenishing agricultural material at a specific position in the boundary area based on the travel route managed by the travel route generation section 47 and the amount of the agricultural material loaded on the work device 30, and the unit input amount of agricultural material. The set position can be checked on the touch panel 40 and, if necessary, can be changed. In addition, a replenishment flag is given to the previous travel route Ls that is closest to the set replenishment position. The above replenishment travel is performed when U-turn transition travel is performed from the ending point of the previous travel route Ls to which the replenishment flag is given.

The second control unit 5 includes a travel control section 51 and a work control section 52 that serve as control sections for basic control functions enabling the tractor to perform autonomous work travel. The travel control section 51 includes a steering control section 511.

The travel control section 51 has a manual travel control mode and an autonomous travel control mode. If the manual travel control mode is selected, the travel control section 51 provides a travel control signal to the vehicle travel equipment group 91 based on the driver's operation on the accelerator pedal, the shift lever, and so on. If the autonomous travel control mode is selected, the travel control section 51 controls the body 1 of the tractor so that the tractor travels at the engine speed or the vehicle speed specified by autonomous travel parameters. The autonomous and manual travel switching tool 83 is used to perform mode switching between the manual travel control mode and the autonomous travel control mode, but mode switching may be performed automatically based on the work travel state of the tractor.

The work control section 52 also has an automatic work control mode and a manual work control mode. If the manual work control mode is selected, the work control section 52 provides a work control signal to the work device equipment group 92 based on an operation performed by the driver on the work operation tool. If the automatic work control mode is selected, the work control section 52 provides a signal to the work device equipment group 92 based on automatic work parameters, and maintains the posture of the work device 30 and adjusts the amount and width of the agricultural material to be supplied, as specified by the automatic work parameters.

The steering control section 511 outputs operation control signals to the electric steering mechanism included in the vehicle travel equipment group 91, based on steering instructions output from the third control unit 6, such as a route-following travel instruction, a direction change travel instruction, and a replenishment travel instruction.

The third control unit 6 generates a route-following travel instruction used to make the tractor follow the target route, based on the target route set by a travel route setting section 61, the vehicle position sent from the vehicle position computation section 70, and the travel orientation computed from the vehicle positions obtained over time, and provides the route-following travel instruction to the steering control section 511. Furthermore, the third control unit 6 generates a direction change travel instruction to perform the above-described U-turn transition travel, and a replenishment travel instruction in the above-described various replenishment travel modes, and provides the instructions to the steering control section 511.

The third control unit 6 manages autonomous travel control for transition from the previous travel route Ls to the next travel route Ln via turning travel, and autonomous travel control for replenishment travel in various replenishment travel modes, as described with reference to FIGS. 2 and 5. Therefore, the third control unit 6 includes the travel route setting section 61, a route-following travel management section 62, a replenishment management module 63, and a direction change management module 64.

Figure 10:
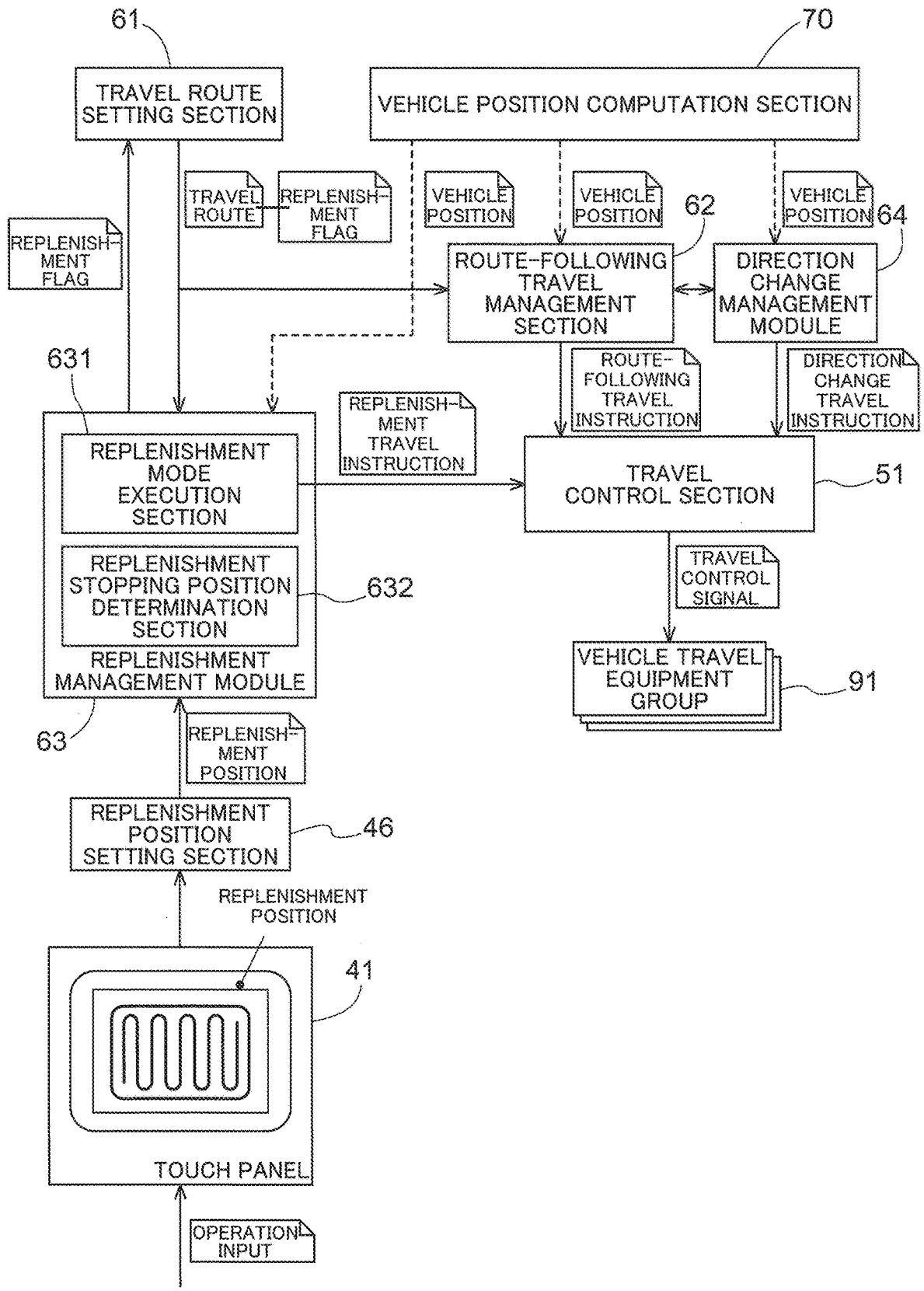
FIG. 10 is a block diagram indicating a data flow in autonomous travel of the tractor, including replenishment travel.

Hereinafter, the functions of the third control unit 6 will be described with reference to FIGS. 6, 9, and 10. The travel route setting section 61 sets a travel route generated or managed by the travel route generation section 47, as a target route for autonomous travel. The route-following travel management section 62 provides the travel control section 51 with a route-following travel instruction to steer the body 1 so that the tractor follows the target route set by the travel route setting section 61 or the target route set by the replenishment management module 63, based on the vehicle position.

The direction change management module 64 manages and sets travel routes for the direction change of the body 1 of the tractor, such as U-turn transition travel. The direction change management module 64 provides the travel control section 51 with a direction change travel instruction to steer the body 1 of the tractor so as to follow the set direction change route, based on the vehicle position. Therefore, the direction change management module 64 includes a turning circle setting section 641, a tangent line following travel management section 642, a turning circle travel management section 643, an interference detection section 644, and an interference avoidance travel management section 645.

Before transition from the previous travel route Ls to the next travel route Ln via turning travel, the turning circle setting section 641 set a virtual turning circle VC as a target route for entry turning travel performed to enter the next travel route Ln.

The tangent line following travel management section 642 computes a tangent line from the vehicle body reference point Pv computed during travel to the virtual turning circle VC. Specifically, the tangent line following travel management section 642 computes a tangent line from the vehicle body reference point Pv to the virtual turning circle VC at predetermined time intervals or predetermined travel distance intervals, and computes a deviation angle defined by the tangent line and the travel orientation (travel direction line) of the body 1 of the tractor. A tangent line when this deviation angle falls within a predetermined angle (for example, 30 degrees) is set as the reference tangent line RT (see FIG. 3), and the travel of the body 1 of the tractor is controlled with use of the reference tangent line as a transition target route.

When the deviation angle falls within a predetermined angle during tangent line following travel, and the body 1 of the tractor reaches the virtual turning circle VC, the turning circle travel management section 643 controls the travel of the body 1 of the tractor with the use of the virtual turning circle VC as the turning target route.

The interference detection section 644 detects the prohibited boundary line BL that is present in the direction of travel of the body of the tractor during travel toward the virtual turning circle VC after the completion of the travel along the previous travel route Ls, or during tangent line following travel under the control of the tangent line following travel management section 642.

The interference avoidance travel management section 645 controls interference avoidance travel to prevent the tractor from interfering with (travelling across) the prohibited boundary line BL determined by the interference detection section 644 as an interfering boundary line. The interference avoidance travel management section 645 computes and sets the interference avoidance route AL as the target route for interference avoidance travel. The interference avoidance route AL is a route along which the tractor can travel at an interval from the interfering boundary line, and that has the same or approximately the same length as the interfering boundary line. After the interference avoidance travel is complete under the control of the interference avoidance travel management section 645, tangent line following travel control is started again to steer the body 1 of the tractor toward the virtual turning circle VC.

The replenishment management module 63 includes a replenishment mode execution section 631 and a replenishment stopping position determination section 632. The replenishment mode execution section 631 executes the above-described various replenishment travel modes to provide a replenishment travel instruction to the travel control section 51. The replenishment stopping position determination section 632 determines a stopping position at a position where the body 1 of the tractor does not interfere with the boundary area and that is suitable for replenishment work, based on the replenishment position set by the replenishment position setting section 46.

Figure 11:
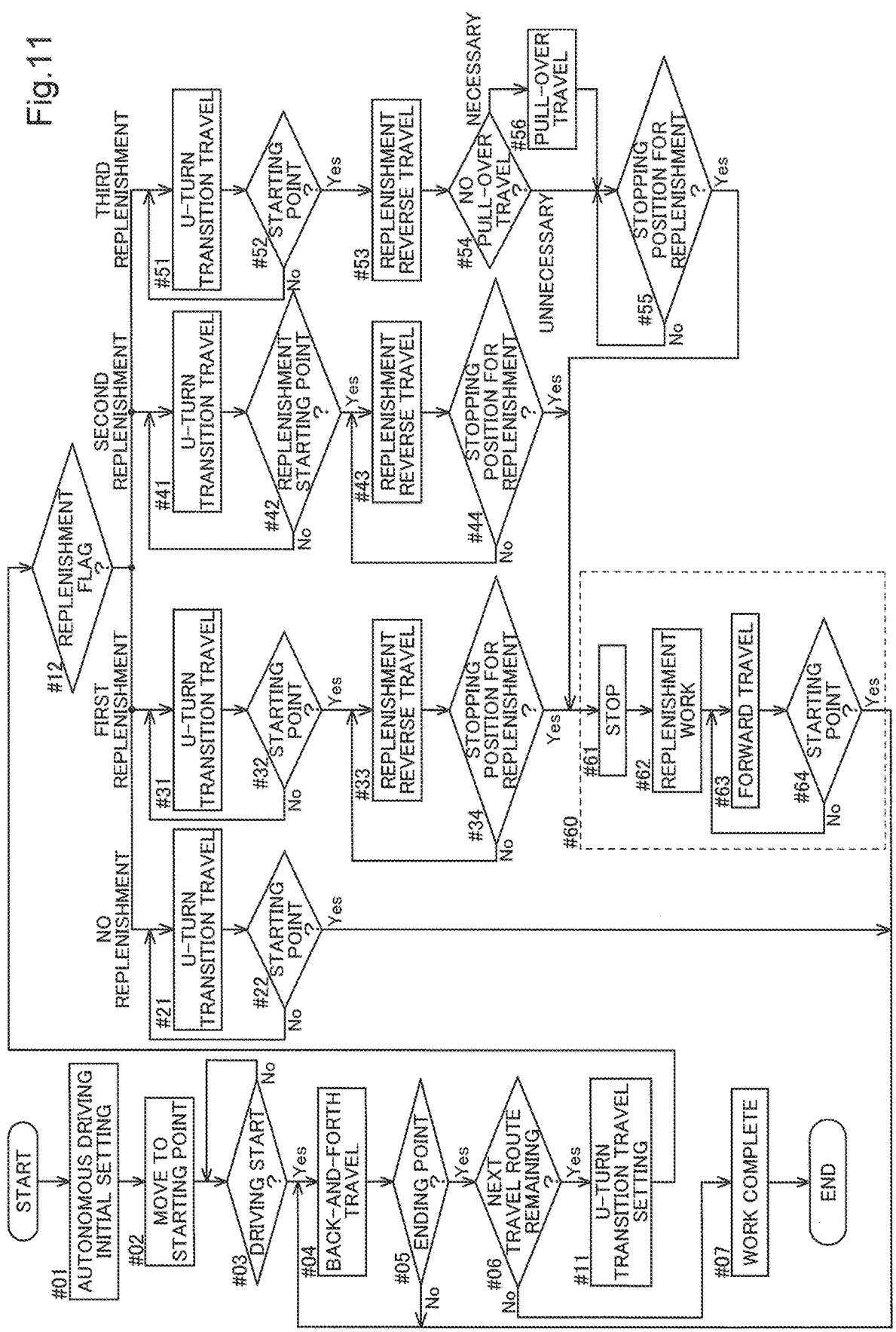
FIG. 11 is a flowchart for replenishment travel and back-and-forth travel.

Next, an example of work travel performed by the tractor to supply agricultural material to the cultivated land will be described with the use of the flowchart in FIG. 11, with reference to FIG. 6. The work travel in this example is work travel along a back-and-forth travel route.

First, various travel parameters, work parameters, and so on used to perform work travel through autonomous driving are initially set (#01). Furthermore, the tractor moves to the starting point of the initial linear travel route, which is the starting position of work travel (#02). The operator performs an autonomous driving starting operation (#03 "Yes" branch), and in response, autonomous work travel with use of a back-and-forth travel route travel route is started (#04). When work travel is started, whether or not the tractor has reached the ending point of the linear travel route along which the tractor is travelling (the previous travel route Ls) (more precisely, whether or not the work reference point of the work device 30 has reached the ending point) (#05). Upon the tractor reaching the ending point of the linear travel route along which the tractor is travelling (the previous travel route Ls) (#05 "Yes" branch), whether or not there is a linear travel route (the next travel route Ln) remaining to be travelled next (#06). If there is no linear travel route remaining to be travelled next (#06 "No" branch), this work is complete and this flow is terminated (#07).

If there is the next travel route Ln, which is a linear travel route remaining to be travelled next (#06 "Yes" branch), U-turn transition travel is performed and the tractor moves to the starting point of the next travel route Ln. For this purpose, various parameters for U-turn transition travel (such as the turning radius and the virtual turning circle VC) are set (#11). Furthermore, the content of the replenishment flag given to the previous travel route Ls is read out, and whether or not agricultural material is to be replenished is checked (#12).

In this implementation, the content of the replenishment flag is (1) no replenishment, (2) first replenishment, (3) second replenishment, or (4) third replenishment. The following describes tractor movements for each replenishment flag content.

(1) No Replenishment

If the content of the replenishment flag is "no replenishment", only U-turn transition travel from the previous travel route Ls to the next travel route Ln shown in FIG. 3 is performed. That is to say, after U-turn transition travel starts (#21), the U-turn transition travel ends when the tractor reaches the starting point of the next travel route Ln (#22 "Yes" branch) and processing returns to step #04, and route-following travel is performed toward the next travel route Ln set as the target route.

(2) First Replenishment

If the content of the replenishment flag is "first replenishment", the first replenishment travel mode shown in the travel examples in FIGS. 5 and 7A is executed. In the first replenishment travel mode, replenishment travel is started when U-turn transition travel from the previous travel route Ls to the next travel route Ln is complete. That is to say, after U-turn transition travel is started (#31), U-turn transition travel ends when the tractor reaches the starting point of the next travel route Ln (#32 "Yes" branch), and reverse replenishment travel is performed (#33). Reverse travel toward the boundary area is performed until the tractor reaches the stopping position for replenishment. Upon the tractor reaching the stopping position for replenishment (#34 "Yes" branch), the replenishment work processing in step #60 is performed. In this replenishment work processing, first, the tractor stops at the stopping position for replenishment (#61). Next, replenishment work is performed (#62). After replenishment work is compete, the tractor returns along the reverse route and travels forward toward the starting point of the next travel route Ln (#63). Upon the tractor reaching the starting point of the next travel route Ln (#64 "Yes" branch), forward travel serving as replenishment travel is complete, processing returns to step #04, and route-following travel is performed toward the next travel route Ln set as the target route.

(3) Second Replenishment

If the content of the replenishment flag is "second replenishment", the second replenishment travel mode shown in the travel example in FIG. 7B is executed. In the second replenishment travel mode, an intersection of the tractor and an extension of the next travel route Ln is the starting point of replenishment travel (replenishment starting point). Therefore, replenishment travel is started upon the tractor reaching a point near an extension of the next travel route Ln partway of U-turn transition travel from the previous travel route Ls to the next travel route Ln. After U-turn transition travel is started (#41), upon the tractor reaching an extension of the next travel route Ln, i.e., upon the tractor reaching the replenishment starting point (#42 "Yes" branch), U-turn transition travel is complete and reverse replenishment travel is performed (#43).

Upon the tractor reaching the stopping position for replenishment set in front of the boundary area (#44 "Yes" branch), the replenishment work processing in step #60 described above is performed. After replenishment work processing is complete, processing returns to step #04, and route-following travel is performed toward the next travel route Ln set as the target route.

(4) Third Replenishment

If the content of the replenishment flag is "third replenishment", the third replenishment travel mode shown in the travel example in FIG. 8B is executed. In the third replenishment travel mode, replenishment work is performed in reverse replenishment travel, in the boundary area portion extending substantially parallel to an extension of the next travel route Ln. That is to say, after U-turn transition travel is started (#51), upon the tractor reaching an extension of the next travel route Ln, or upon the tractor reaching an extension of the next travel route Ln partway of U-turn transition travel (#52 "Yes" branch), U-turn transition travel is complete and reverse replenishment travel is performed (#53). Furthermore, whether or not the tractor needs to perform pull-over travel to the boundary area portion is checked, to perform replenishment work in the boundary area portion (#54). If pull-over travel is unnecessary (#54 "unnecessary" branch), linear reverse travel is continued, and upon the tractor reaching the stopping position for replenishment in front of the boundary area (#55 "Yes" branch), the replenishment work processing in step #60 described above is performed. If pull-over travel is necessary (#54 "necessary" branch), pull-over travel is performed rearward with use of direction change steering so that the tractor approaches the boundary area portion (#56). Furthermore, reverse travel is continued, and upon the tractor reaching the stopping position for replenishment in front of the boundary area (#55 "Yes" branch), the replenishment work processing in step #60 described above is performed. If pull-over travel is performed, steering is performed to correct a horizontal deviation caused due to pull-over travel, during forward replenishment travel toward the starting point of the next travel route Ln. After replenishment work processing is complete, processing returns to step #04, and route-following travel is performed toward the next travel route Ln set as the target route.

Figure 12:
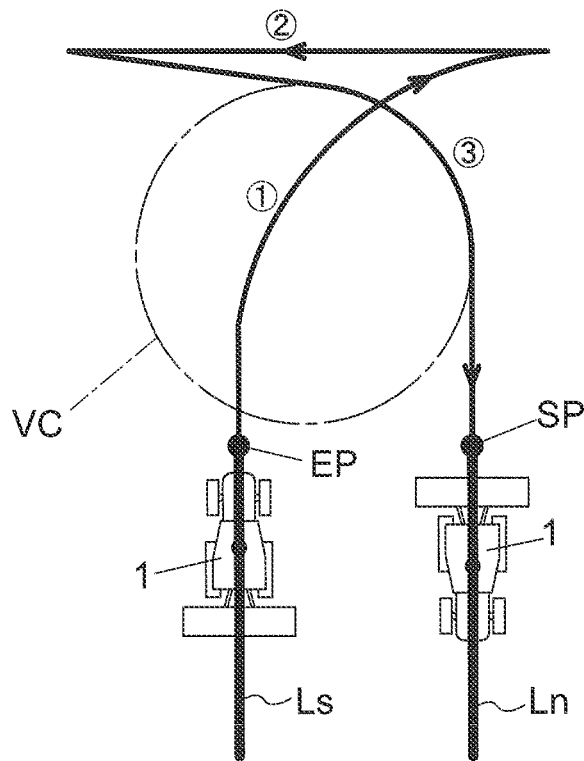
FIG. 12 is a schematic diagram for illustrating three-point turn.
Figure 13:
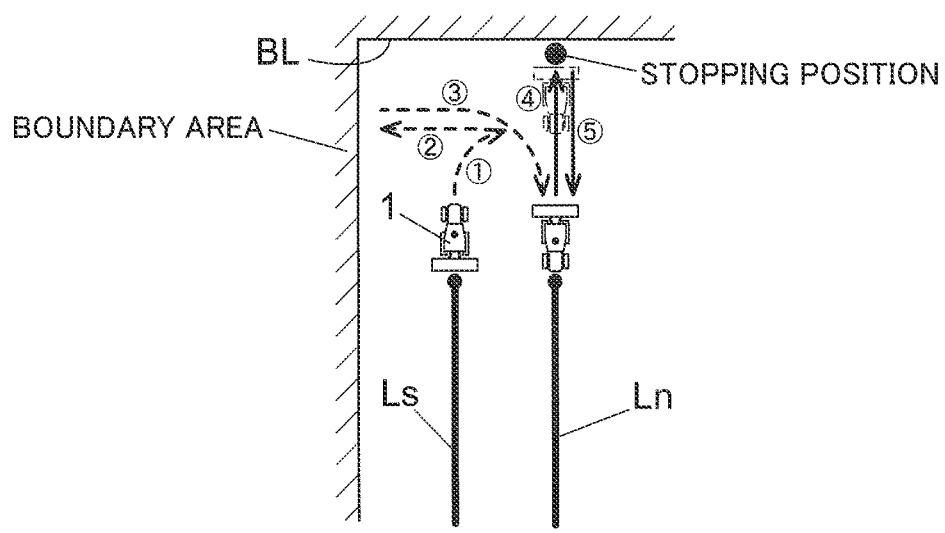
FIG. 13 is a schematic diagram showing Application Example 1 of various application examples of U-turn transition travel accompanied by replenishment travel.
Figure 14:
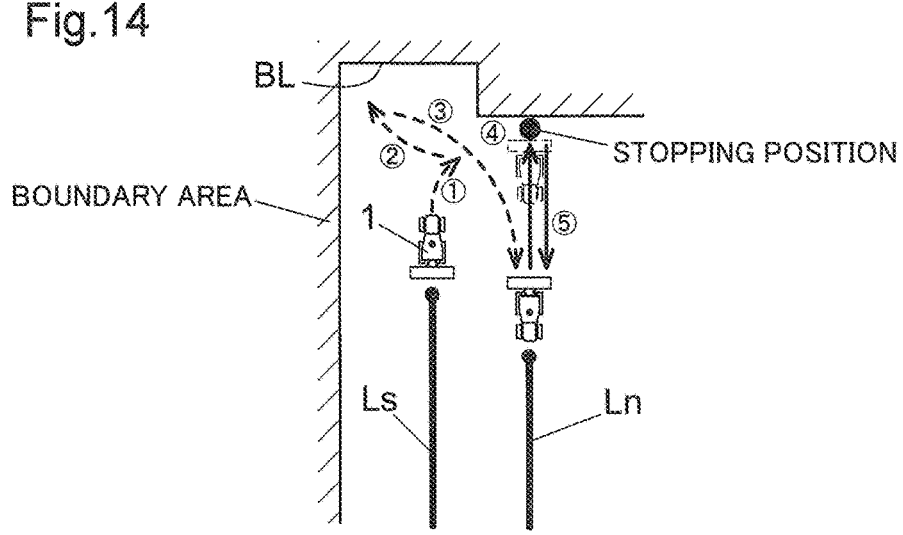
FIG. 14 is a schematic diagram showing Application Example 2 of the various application examples of U-turn transition travel accompanied by replenishment travel.
Figure 15:
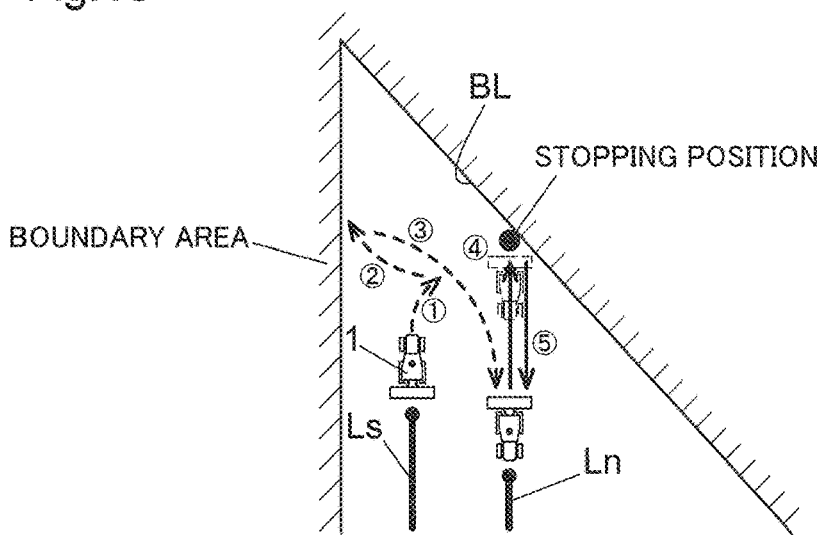
FIG. 15 is a schematic diagram showing Application Example 3 of the various application examples of U-turn transition travel accompanied by replenishment travel.
Figure 16:
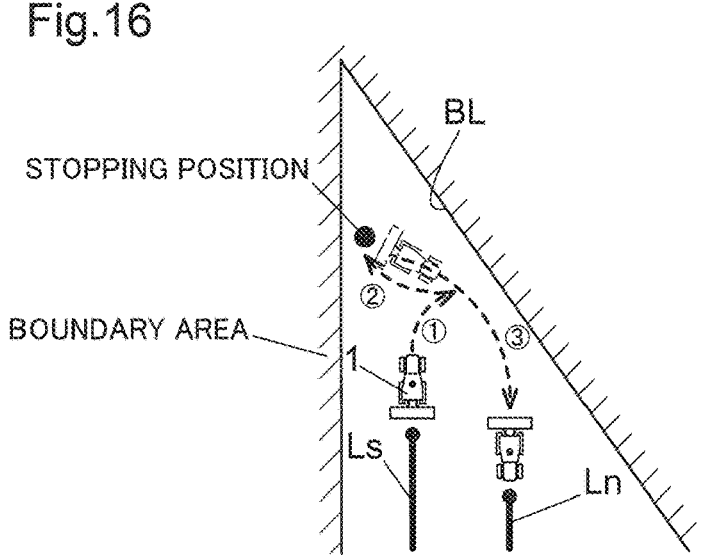
FIG. 16 is a schematic diagram showing Application Example 4 of the various application examples of U-turn transition travel accompanied by replenishment travel.
Figure 17:
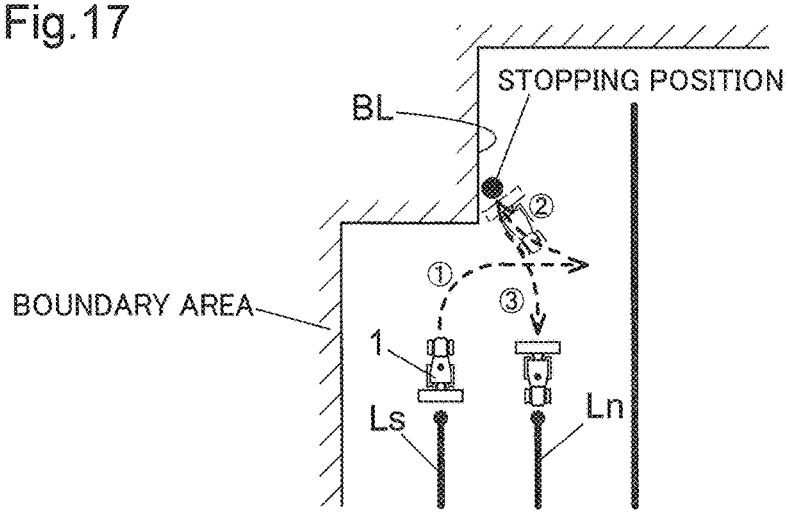
FIG. 17 is a schematic diagram showing Application Example 5 of the various application examples of U-turn transition travel accompanied by replenishment travel.
Figure 18:
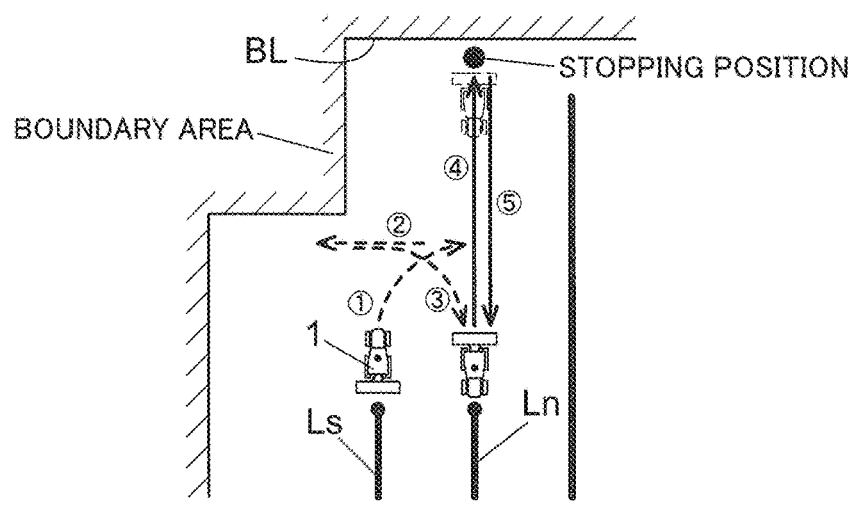
FIG. 18 is a schematic diagram showing Application Example 6 of the various application examples of U-turn transition travel accompanied by replenishment travel.
Figure 19:
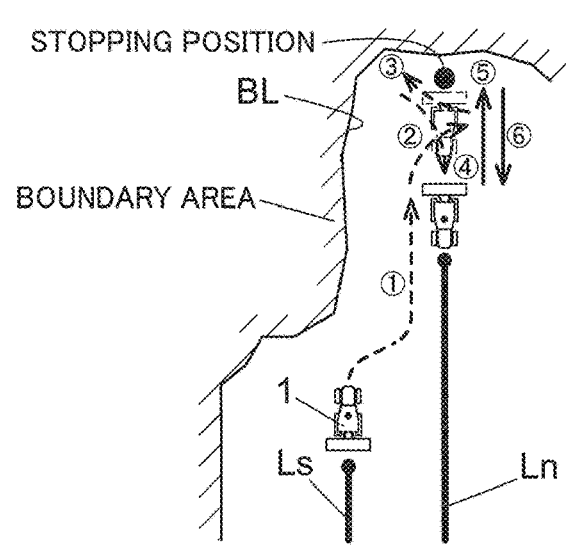
FIG. 19 is a schematic diagram showing Application Example 7 of the various application examples of U-turn transition travel accompanied by replenishment travel.
Figure 20:
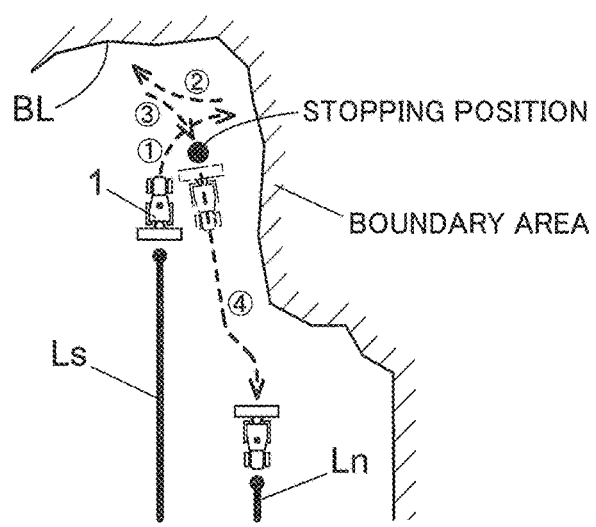
FIG. 20 is a schematic diagram showing Application Example 8 of the various application examples of U-turn transition travel accompanied by replenishment travel.
Figure 21:
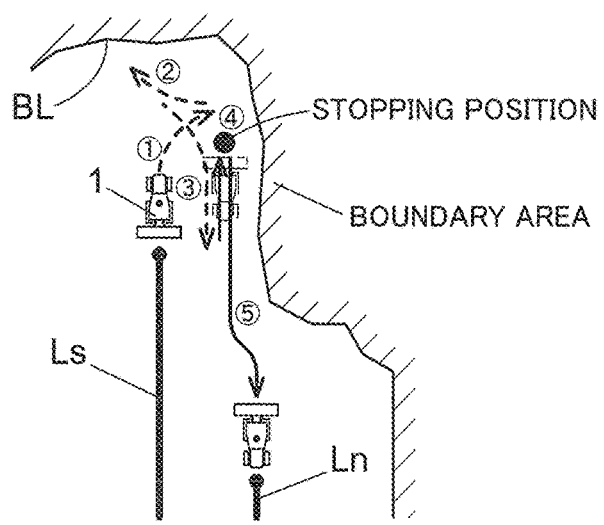
FIG. 21 is a schematic diagram showing Application Example 9 of the various application examples of U-turn transition travel accompanied by replenishment travel.

As shown in FIGS. 5 and 6, turning travel that only includes forward travel is used in normal U-turn transition travel, but when the distance between the previous travel route Ls and the next travel route Ln is short, or when the tractor is in a cul-de-sac, a three-point turn that includes reverse travel needs to be performed in U-turn transition travel. FIG. 12 shows an example of U-turn transition travel in which a three-point turn is used. In this example, after the tractor has passed the ending point of the previous travel route Ls, a first turn is made with a steering angle of 90 degrees inside and outside toward the next travel route Ln. Thereafter, reverse travel is performed with a three-point turn steering angle. Finally, after travelling forward toward the virtual turning circle VC set near the starting point of the next travel route Ln, the vehicle makes a turn with use of the virtual turning circle VC, and enters the next travel route Ln.

Next, various application examples of replenishment travel performed in U-turn transition travel that includes the above-described three-point turn are shown in FIGS. 13 to 21. Note that in FIGS. 13 to 21, the travel order of the tractor is indicated by circled numbers.

Application Example 1: See FIG. 13

In Application Example 1, the ending point of the previous travel route Ls and the starting point of the next travel route Ln are aligned in a lateral direction with respect to the routes. First, the tractor makes a 90-degree turn toward the next travel route Ln, and from this position, the tractor travels rearward in a direction intersecting the travel routes. The movement up to this point is a three-point turn. Thereafter, the tractor travels forward along the tangent line to the virtual turning circle VC set as the target route, makes a 90-degree turn along the virtual turning circle VC, and heads for the starting point of the next travel route Ln. The movement up to this point is U-turn transition travel. Replenishment travel is started, and the tractor travels rearward from the starting point of the next travel route Ln toward the boundary area, where replenishment work is performed. After replenishment work is complete, the tractor travels forward to the starting point of the next travel route Ln, and enters the next travel route Ln. This is U-turn transition travel accompanied by replenishment travel, suitable when the distance between the back-and-forth travel route and the boundary area is short, i.e., when the width of the peripheral area is short.

Application Example 2: See FIG. 14

In Application Example 2, when compared to Application Example 1, the boundary area (the prohibited boundary line BL) has a step that protrudes toward the next travel route Ln, and therefore the next travel route Ln is shorter than the previous travel route Ls. Accordingly, the starting point of the next travel route Ln is shifted downward in FIG. 14 from the ending point of the previous travel route Ls. If the length of the protrusion of the step is large, it is necessary to consider avoiding interference with the boundary area that provides this protruding step, when the tractor transitions from the three-point turn to U-turn transition travel. If interference occurs, interference avoidance travel is performed.

Application Example 3: See FIG. 15

In Application Example 3, the boundary area (the prohibited boundary line BL) extends diagonally to the travel routes, and substantially the same travel as in Application Example 2 is performed.

Application Example 4: See FIG. 16

The shape of the boundary area (the prohibited boundary line BL) in Application Example 4 is similar to that in Application Example 3. However, in Application Example 4, the ending point of the reverse travel in the three-point turn is close to the boundary area, and therefore the tractor stops at the ending point serving as the replenishment stopping position, where replenishment work is performed. After replenishment work is complete, the tractor travels forward to the starting point of the next travel route Ln, and enters the next travel route Ln. That is to say, the final section of the three-point turn overlaps the first section of U-turn transition travel.

Application Example 5: See FIG. 17

In Application Example 5, the boundary area (the prohibited boundary line BL) has a step that includes a boundary area portion that extends parallel to an extension of the next travel route Ln. The distance between the boundary area portion and the extension of the next travel route Ln is short, and therefore, partway of reverse replenishment travel after the three-point turn, the tractor is pulled over to the boundary area portion extending along the routes, where replenishment work is performed. That is to say, Application Example 5 is a combination of U-turn transition travel that includes a three-point turn, and the third replenishment travel mode.

Application Example 6: See FIG. 18

The shape of the boundary area (the prohibited boundary line BL) in Application Example 6 is similar to that in Application Example 5. However, in Application Example 6, the distances from the boundary area portion extending along the routes, to the previous travel route Ls and to the next travel route Ln, are large, and therefore replenishment work is not performed in the boundary area portion, but is performed in the boundary area that is located ahead of the direction in which the previous travel route Ls and the next travel route Ln extend.

Application Example 7: See FIG. 19

In Application Example 7, the boundary area (the prohibited boundary line BL) has a step that includes the boundary area portion extending along the next travel route Ln, and the next travel route Ln is longer than the previous travel route Ls. Therefore, the tractor performs forward travel accompanied by direction change steering along the boundary area, to a position near the starting point of the next travel route Ln, and performs the same travel as in Application Example 1.

Application Example 8: See FIG. 20

The shape of the boundary area in Application Example 8 is symmetrical to that in Application Example 7. In Application Example 8, after passing the ending point of the previous travel route Ls, the tractor performs a three-point turn and heads for the starting point of the next travel route Ln. Partway of the forward travel to the starting point of the next travel route Ln, the tractor pulls over to the replenishment stopping position set in the boundary area portion extending along the routes, where replenishment work is performed. Thereafter, the tractor performs forward travel including an orientation change, to the starting point of the next travel route Ln, and enters the next travel route Ln. The replenishment travel mode described above, in which the tractor heads for the replenishment stopping position by pulling over in a forward direction and stops at the replenishment stopping position where replenishment work is performed, is a fourth replenishment travel mode.

Application Example 9: See FIG. 21

Application Example 9 is a modification of Application Example 8. In Application Example 9, after passing the ending point of the previous travel route Ls, the tractor performs a three-point turn and heads for the starting point of the next travel route Ln. Partway of the forward travel to the starting point of this next travel route Ln, the tractor first travels rearward, and pulls over to the replenishment stopping position set in the boundary area portion extending along the routes, where replenishment work is performed. Thereafter, the tractor performs forward travel including an orientation change, to the starting point of the next travel route Ln, and enters the next travel route Ln.

Figure 22:
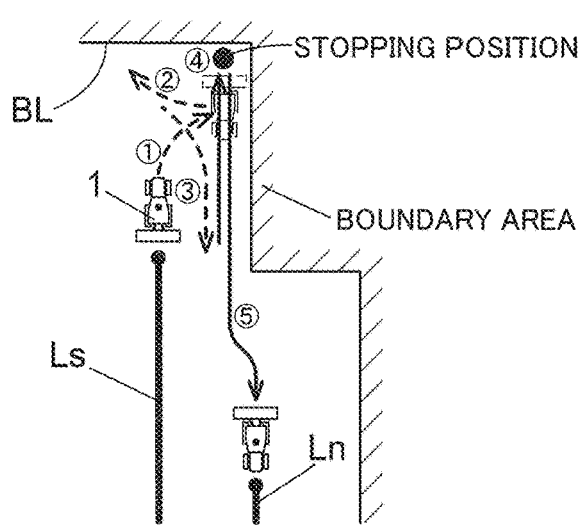
FIG. 22 is a schematic diagram showing Application Example 10 of the various application examples of U-turn transition travel accompanied by replenishment travel.

Application Example 10: See FIG. 22

Application Example 10 is a modification of Application Example 9. In Application Example 10, after passing the ending point of the previous travel route Ls, the tractor performs a three-point turn and heads for the starting point of the next travel route Ln. Partway of forward travel to the starting point of this next travel route Ln, the tractor further travels rearward, and pulls over to the replenishment stopping position set in the boundary area. Replenishment work is performed therein. Thereafter, the tractor performs forward travel including an orientation change, to the starting point of the next travel route Ln, and enters the next travel route Ln.

Application Example 11: See FIG. 23

Application Example 11 shows a travel route for avoiding duplicate work on areas where work has already been performed. In FIG. 23, an already-worked area on which work has already been performed using an already-worked travel route is indicated by oblique lines and is given a reference sign WL. Specifically, the interference avoidance travel management section 645 sets the contour of the already-worked area as a prohibited boundary line BL, and performs interference avoidance travel control to prevent the tractor from entering inside the prohibited boundary line BL. Note that the already-worked area is not limited to the area already worked by the same tractor, but can also be another tractor or the area already worked by another tractor. In Application Example 11, after the tractor passes the ending point of the previous travel route Ls, virtual turning circles VCs are respectively set near two corners of an already-worked area, and the tractor performs U-turn transition travel to bypass the already-worked area (the already-worked travel route). The tractor makes a turn with use of the second virtual turning circle VC. Upon reaching an extension of the next travel route Ln, the tractor travels rearward to the boundary area, where replenishment work is performed. After replenishment work is complete, the tractor travels forward to the starting point of the next travel route Ln, and enters the next travel route Ln. That is to say, U-turn transition travel for bypassing the already-worked area and the execution of the second replenishment travel mode are performed in combination. Of rouse, if the distance between the second virtual turning circle VC and the starting point of the next travel route Ln is short, the first replenishment travel mode may be used.

Modified Preferred Embodiments (1) In the above preferred embodiments, the positional relationship between the prohibited boundary lines BL and the tractor such as that shown in FIG. 4 is determined based on the map coordinates of the tractor computed based on satellite positioning data acquired from the satellite positioning module 7. Alternatively, or additionally, the positional relationship between the prohibited boundary lines BL and the tractor may be determined based on measurement data acquired by a distance measuring device provided on the tractor.

(2) The division of the functional sections in the functional block diagram shown in FIG. 9 and the division of the first control unit 4, the second control unit 5, and the third control unit 6 are examples for clarity of description, and several functional sections may be integrated into one section, or a single functional section may be divided into multiple sections.

Note that the configurations disclosed in the above preferred embodiments (including the modified preferred embodiments, the same applies hereinafter) can be applied in combination with the configurations disclosed in the other preferred embodiments, as long as there is no contradiction. In addition, the preferred embodiments disclosed herein are examples, and the preferred embodiments of the present invention are not limited thereto, and may be modified as appropriate within the scope of the present invention.

Preferred embodiments of the present invention are applicable to cultivated land work vehicles that supply agricultural material to a cultivated land while travelling autonomously.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A cultivated land work vehicle to, while travelling autonomously along travel routes set in a cultivated land surrounded by a boundary area, supply agricultural material to the cultivated land, the cultivated land work vehicle comprising:
  one or more controllers configured to define and function as:
  a travel route setter to set, as the travel routes, a peripheral travel route for circular or substantially circular travel in a peripheral area of the cultivated land, and a linear back-and-forth travel route for back-and-forth travel inward from the peripheral area;
  a vehicle position computer to compute a vehicle position of the cultivated land work vehicle;
  a travel controller to control travel of a body of the cultivated land work vehicle based on the vehicle position and a travel route among the travel routes which travel route has been set as a target route; and
  a replenishment mode executor to execute a replenishment travel mode to replenish the cultivated land work vehicle with the agricultural material in the boundary area, during U-turn transition travel for transition from the back-and-forth travel route, which is a previous travel route, to the back-and-forth travel route, which is a next travel route, and provide the travel controller with a replenishment travel instruction; wherein
  the replenishment mode executor is operable to execute a first replenishment travel mode or a second replenishment travel mode depending on an arrangement of the travel routes in the cultivated land;
  in the first replenishment travel mode, the body performs reverse travel to the boundary area after reaching a starting point of the next travel route, and performs forward travel to the starting point of the next travel route after replenishment work is complete; and
  in the second replenishment travel mode, the body performs reverse travel into the boundary area before reaching the starting point of the next travel route, and performs forward travel to the starting point of the next travel route after the replenishment work is complete.

2. The cultivated land work vehicle according to claim 1, wherein
  the replenishment mode executor is operable to execute a third replenishment travel mode depending on the arrangement of the travel routes in the cultivated land; and
  in the third replenishment travel mode:
  the body starts reverse travel to the boundary area partway through the U-turn transition travel, or starts reverse travel to the boundary area after reaching the starting point of the next travel route;
  the replenishment work is performed partway through the reverse travel; and
  the body performs forward travel to the starting point of the next travel route after the replenishment work is complete.

3. The cultivated land work vehicle according to claim 1, wherein
  the replenishment mode executor is operable to execute a fourth replenishment travel mode depending on the arrangement of the travel routes in the cultivated land; and
  in the fourth replenishment travel mode:
  the replenishment work is performed partway through the forward travel to the starting point of the next travel route started after the reverse travel performed in the U-turn transition travel; and
  the body performs forward travel to the starting point of the next travel route after the replenishment work is complete.

4. The cultivated land work vehicle according to claim 1, wherein the replenishment mode executor is operable to perform the first replenishment travel mode or the second replenishment travel mode depending on a mutual positional relationship between the boundary area in which a replenishment point is set, an ending point of the previous travel route, and the starting point of the next travel route.

5. The cultivated land work vehicle according to claim 1, wherein, if a distance between the boundary area in which a replenishment point is set and the starting point of the next travel route is shorter than or equal to a predetermined distance, the replenishment mode executor is operable to execute the first replenishment travel mode, and if the distance is longer than the predetermined distance, the replenishment mode executor is operable to execute the second replenishment travel mode.

6. The cultivated land work vehicle according to claim 1, wherein, if a distance between the boundary area in which a replenishment point is set and the starting point of the next travel route is shorter than or equal to a predetermined distance, the replenishment mode executor is operable to execute the first replenishment travel mode, and if the distance between the boundary area in which the replenishment point is set and the starting point of the next travel route is longer than the predetermined distance and the distance between the boundary area in which the replenishment point is set and the starting point of the next travel route is longer than a distance between the boundary area and an ending point of the previous travel route by a determination distance, the replenishment mode executor is operable to execute the second replenishment travel mode.

7. The cultivated land work vehicle according to claim 1, wherein the previous travel route in which replenishment with the agricultural material is presumed to be required is given a replenishment flag, and the replenishment travel mode is executed in the U-turn transition travel performed from the ending point of the previous travel route to which the replenishment flag is given.

8. The cultivated land work vehicle according to claim 1, wherein a tangent line from the body to a virtual turning circle set at or adjacent to the starting point of the next travel route, and the virtual turning circle, are used as the target routes for the U-turn transition travel.

9. The cultivated land work vehicle according to claim 8, wherein in response to the tangent line extending through the boundary area, interference avoidance travel is performed to prevent the body from intersecting with the boundary area.

10. A cultivated land work vehicle to, while travelling autonomously along travel routes set in a cultivated land surrounded by a boundary area, supply agricultural material to the cultivated land, the cultivated land work vehicle comprising:
one or more controllers configured to define and function as:
a travel route setter to set, as the travel routes, a peripheral travel route for circular or substantially circular travel in a peripheral area of the cultivated land, and a linear back-and-forth travel route for back-and-forth travel inward from the peripheral area;
a vehicle position computer to compute a vehicle position of the cultivated land work vehicle;
a travel controller to control travel of a body of the cultivated land work vehicle based on the vehicle position and a travel route among the travel routes which travel route has been set as a target route; and
a replenishment mode executor to execute a replenishment travel mode to replenish the cultivated land work vehicle with the agricultural material in the boundary area, during U-turn transition travel for transition from the back-and-forth travel route, which is a previous travel route, to the back-and-forth travel route, which is a next travel route, and provide the travel controller with a replenishment travel instruction; wherein
the replenishment mode executor is operable to execute a first replenishment travel mode or a third replenishment travel mode depending on an arrangement of the travel routes in the cultivated land;
in the first replenishment travel mode, the body performs reverse travel into the boundary area after reaching a starting point of the next travel route, and performs forward travel to the starting point of the next travel route after replenishment work is complete; and
in the third replenishment travel mode:
the body starts reverse travel to the boundary area partway through the U-turn transition travel, or starts reverse travel to the boundary area after reaching the starting point of the next travel route;
the replenishment work is performed partway through the reverse travel; and
the body performs forward travel to the starting point of the next travel route after the replenishment work is complete.

11. An agricultural material replenishment method for a cultivated land work vehicle to, while travelling autonomously along travel routes set in a cultivated land surrounded by a boundary area, supply agricultural material to the cultivated land, the agricultural material replenishment method comprising:
travelling along a back-and-forth travel route, which is a previous travel route;
determining whether a replenishment mode set in advance is a first replenishment travel mode or a second replenishment travel mode; and
performing U-turn transition travel for transition from the previous travel route to the back-and-forth travel route, which is a next travel route, and replenishment travel for replenishment with the agricultural material, according to the determined replenishment mode; wherein
in the first replenishment travel mode, reverse travel into the boundary area is performed after a starting point of the next travel route is reached, and forward travel to the starting point of the next travel route is performed after replenishment work is complete; and
in the second replenishment travel mode, reverse travel into the boundary area is performed before the starting point of the next travel route is reached, and forward travel to the starting point of the next travel route is performed after the replenishment work is complete.

* * * * *